US011817111B2

(12) United States Patent
Fejgin et al.

(10) Patent No.: US 11,817,111 B2
(45) Date of Patent: Nov. 14, 2023

(54) PERCEPTUALLY-BASED LOSS FUNCTIONS FOR AUDIO ENCODING AND DECODING BASED ON MACHINE LEARNING

(71) Applicant: Dolby Laboratories Licensing Corporation, San Francisco, CA (US)

(72) Inventors: Roy M. Fejgin, San Francisco, CA (US); Grant A. Davidson, Burlingame, CA (US); Chih-Wei Wu, San Francisco, CA (US); Vivek Kumar, Foster City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 602 days.

(21) Appl. No.: 17/046,284

(22) PCT Filed: Apr. 10, 2019

(86) PCT No.: PCT/US2019/026824
§ 371 (c)(1),
(2) Date: Oct. 8, 2020

(87) PCT Pub. No.: WO2019/199995
PCT Pub. Date: Oct. 17, 2019

(65) Prior Publication Data
US 2021/0082444 A1 Mar. 18, 2021

Related U.S. Application Data

(60) Provisional application No. 62/829,552, filed on Apr. 4, 2019, provisional application No. 62/656,275, filed on Apr. 11, 2018.

(30) Foreign Application Priority Data

May 22, 2018 (EP) ..................................... 18173673

(51) Int. Cl.
*G10L 19/022* (2013.01)
*G06F 3/16* (2006.01)
(Continued)

(52) U.S. Cl.
CPC .............. *G10L 19/022* (2013.01); *G06F 3/16* (2013.01); *G06N 3/048* (2023.01); *G06N 3/084* (2013.01)

(58) Field of Classification Search
USPC ...................................................... 704/1–504
See application file for complete search history.

(56) References Cited

U.S. PATENT DOCUMENTS 8,484,022 B1 * 7/2013 Vanhoucke ............ G06N 3/045
700/48
9,640,194 B1 5/2017 Nemala
(Continued)

FOREIGN PATENT DOCUMENTS

CA 2482427 C 1/2010
CN 101790757 B 5/2012
(Continued)

OTHER PUBLICATIONS

Atreya, A. et al. "Novel Lossy Compression Algorithms with Stacked Autoencoders" Internet Citation, Dec. 11, 2009, pp. 1-5.
(Continued)

*Primary Examiner* — Marcus T Riley

(57) ABSTRACT

Computer-implemented methods for training a neural network, as well as for implementing audio encoders and decoders via trained neural networks, are provided. The neural network may receive an input audio signal, generate an encoded audio signal and decode the encoded audio signal. A loss function generating module may receive the decoded audio signal and a ground truth audio signal, and may generate a loss function value corresponding to the
(Continued)

decoded audio signal. Generating the loss function value may involve applying a psychoacoustic model. The neural network may be trained based on the loss function value. The training may involve updating at least one weight of the neural network.

19 Claims, 15 Drawing Sheets

(51) Int. Cl.
  *G06N 3/084* (2023.01)
  *G06N 3/048* (2023.01)

(56) References Cited

U.S. PATENT DOCUMENTS

| | | | |
|---|---|---|---|
| 9,679,258 B2 | 6/2017 | Mnih | |
| 9,779,727 B2 | 10/2017 | Yu | |
| 11,373,672 B2 * | 6/2022 | Mesgarani | H04R 25/507 |
| 11,538,455 B2 * | 12/2022 | Zhou | G06N 3/048 |
| 11,687,778 B2 * | 6/2023 | Ciftci | G06F 18/2415 |
| | | | 382/115 |
| 2003/0115041 A1 | 6/2003 | Chen | |
| 2004/0044533 A1 | 3/2004 | Najaf-Zadeh | |
| 2014/0372112 A1 | 12/2014 | Xue | |
| 2015/0149165 A1 | 5/2015 | Saon | |
| 2016/0307095 A1 | 10/2016 | Li | |
| 2019/0066713 A1 * | 2/2019 | Mesgarani | G10L 25/30 |
| 2020/0410976 A1 * | 12/2020 | Zhou | G06N 3/048 |
| 2021/0082444 A1 * | 3/2021 | Fejgin | G10L 19/022 |
| 2022/0392482 A1 * | 12/2022 | Mesgarani | G10L 25/30 |

FOREIGN PATENT DOCUMENTS

| | | |
|---|---|---|
| CN | 101501759 B | 8/2012 |
| CN | 101872618 B | 8/2012 |
| CN | 107516527 A | 12/2017 |
| CN | 105070293 B | 8/2018 |
| CN | 106782575 B | 12/2020 |

OTHER PUBLICATIONS

Balle, J. et al. (2016). "End-to-end optimization of nonlinear transform codes for perceptual quality". In Proceedings of the Picture Coding Symposium (PCS).

Beerends, J. G. et al., 2013, "Perceptual Objective Listening Quality Assessment (POLQA), the third generation ITU-T standard for end-to-end speech quality measurement Part I-temporal alignment". AES: Journal of the Audio Engineering Society, 61(6), 366-384.

Fastl, H. et al. (2007), Psychoacoustics: Facts and Models (3rd ed., Springer).

Goodfellow, I. et al "Deep Learning" MIT Press Book, 2016.

Johnson, J. et al "Perceptual losses for real-time style transfer and super-resolution" In Proceedings of the European Conference on Computer Vision (ECCV) (vol. 9906 LNCS, pp. 694-711), 2016.

Kankanahalli, Srihari "End-to-End Optimized Speech Coding with Deep Neural Networks" IEEE International Conference on Acoustics, Speech and Signal Processing, Apr. 15, 2018, pp. 2521-2525.

Kingma, D.P. et al "Adam: a Method for Stochastic Optimization," in Proceedings of the International Conference on Learning Representations (ICLR), 2015, pp. 1-15.

Ledig, C. et al "Photo-Realistic Single Image Super-Resolution Using a Generative Adversarial Network" Sep. 16, 2016, pp. 4681-4690.

Marchi, E. et al "Deep Recurrent Neural Network-Based Autoencoders for Acoustic Novelty Detection" Hindawi Computational Intelligence and Neuroscience, vol. 2017, published Jan. 15, 2017, 14 pages.

Martinez, A.M. et al., "Should deep neural nets have ears? the role of auditory features in deep learning approaches", In Proceedings of the Annual Conference of the International Speech Communication Association (pp. 2435-2439), Sep. 2014.

Moore, B. et al chapter 3 (Frequency Selectivity, Masking, and the Critical Band) of. (2012), An Introduction to the Psychology of Hearing (Emerald Group Publishing).

Nikunen, J. et al "Noise-to-mask ratio minimization by weighted non-negative matrix factorization," in Proceedings of the International Conference on Acoustics Speech and Signal Processing (ICASSP), 2010, pp. 25-28.

Tripathi, A. et al "Asymmetric Stacked Autoencoder" International Joint Conference on Neural Networks, May 14, 2017, pp. 911-918.

* cited by examiner

PERCEPTUALLY-BASED LOSS FUNCTIONS FOR AUDIO ENCODING AND DECODING BASED ON MACHINE LEARNING

TECHNICAL FIELD

This disclosure relates to the processing of audio signals. In particular, this disclosure relates to encoding and decoding audio data.

BACKGROUND

An audio codec is a device or a computer program that is capable of encoding and/or decoding digital audio data, given a particular audio file or streaming media audio format. The main objective of an audio codec is generally to represent an audio signal with a minimum number of bits, while retaining audio quality to the extent that is feasible for that number of bits. Such audio data compression can reduce both the storage space required for audio data and the bandwidth required for transmission of the audio data.

SUMMARY

Various audio processing methods are disclosed herein. Some such methods may be computer-implemented audio processing methods that involve receiving, by a neural network implemented via a control system comprising one or more processors and one or more non-transitory storage media, an input audio signal. Such methods may involve generating, by the neural network and based on the input audio signal, an encoded audio signal. Some such methods may involve decoding, via the control system, the encoded audio signal to produce a decoded audio signal and receiving, by a loss function generating module that is implemented via the control system, the decoded audio signal and a ground truth audio signal. Such methods may involve generating, by the loss function generating module, a loss function value corresponding to the decoded audio signal. Generating the loss function value may involve applying a psychoacoustic model. Such methods may involve training the neural network based on the loss function value. The training may involve updating at least one weight of the neural network.

According to some implementations, training the neural network may involve backward propagation based on the loss function value. In some examples, the neural network may include an autoencoder. Training the neural network may involve changing a physical state of at least one non-transitory storage medium location corresponding with at least one weight of the neural network.

In some implementations, a first portion of the neural network may generate the encoded audio signal and a second portion of the neural network may decode the encoded audio signal. In some such implementations, the first portion of the neural network may include an input neuron layer and a plurality of hidden neuron layers. The input neuron layer may, in some instances, include more neurons than a final hidden neuron layer. At least some neurons of the first portion of the neural network may be configured with rectified linear unit (ReLU) activation functions. In some examples, at least some neurons in hidden layers of the second portion of the neural network may be configured with ReLU activation functions and at least some neurons in an output layer of the second portion may be configured with sigmoidal activation functions.

According to some examples, the psychoacoustic model may be based, at least in part, on one or more psychoacoustic masking thresholds. In some implementations, the psychoacoustic model may involve modeling an outer ear transfer function, grouping into critical bands, frequency-domain masking (including but not limited to level-dependent spreading), modeling of a frequency-dependent hearing threshold and/or calculation of a noise-to-mask ratio. In some examples, the loss function may involve calculating an average noise-to-masking ratio and the training may involve minimizing the average noise-to-masking ratio.

Some audio encoding methods and devices are disclosed herein. In some examples, an audio encoding method may involve receiving, by a control system comprising one or more processors and one or more non-transitory storage media operatively coupled to the one or more processors, a currently-input audio signal. The control system may be configured to implement an audio encoder comprising a neural network that has been trained according to any of the methods disclosed herein. Such methods may involve encoding, via the audio encoder, the currently-input audio signal in a compressed audio format and outputting an encoded audio signal in the compressed audio format.

Some audio decoding methods and devices are disclosed herein. In some examples, an audio decoding method may involve receiving, by a control system comprising one or more processors and one or more non-transitory storage media operatively coupled to the one or more processors, a currently-input compressed audio signal. The control system may be configured to implement an audio decoder comprising a neural network that has been trained according to any of the methods disclosed herein. Such methods may involve decoding, via the audio decoder, the currently-input compressed audio signal and outputting a decoded audio signal. Some such methods may involve reproducing the decoded audio signal via one or more transducers.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, various innovative aspects of the subject matter described in this disclosure can be implemented in a non-transitory medium having software stored thereon. The software may, for example, include instructions for controlling at least one device to process audio data. The software may, for example, be executable by one or more components of a control system such as those disclosed herein. The software may, for example, include instructions for performing one or more of the methods disclosed herein.

At least some aspects of the present disclosure may be implemented via apparatus. For example, one or more devices may be configured for performing, at least in part, the methods disclosed herein. In some implementations, an apparatus may include an interface system and a control system. The interface system may include one or more network interfaces, one or more interfaces between the control system and a memory system, one or more interfaces between the control system and another device and/or one or more external device interfaces. The control system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. Accordingly, in some implementations the control system may include one or more processors and one or more non-transitory storage media operatively coupled to the one or more processors.

According to some such examples, the apparatus may include an interface system and a control system. The control system may, for example, be configured for implementing one or more of the methods disclosed herein. For example, the control system may be configured to implement an audio encoder. The audio encoder may include a neural network that has been trained according to one or more of the methods disclosed herein. The control system may be configured for receiving a currently-input audio signal, for encoding the currently-input audio signal in a compressed audio format and for outputting (e.g., via the interface system) an encoded audio signal in the compressed audio format.

Alternatively, or additionally, the control system may be configured to implement an audio decoder. The audio decoder may include a neural network that has been trained according to a process that involves receiving, by the neural network and via the interface system, an input training audio signal and generating, by the neural network and based on the input training audio signal, an encoded training audio signal. The process may involve decoding, via the control system, the encoded training audio signal to produce a decoded training audio signal and receiving, by a loss function generating module that is implemented via the control system, the decoded training audio signal and a ground truth audio signal. The process may involve generating, by the loss function generating module, a loss function value corresponding to the decoded training audio signal. Generating the loss function value may involve applying a psychoacoustic model. The process may involve training the neural network based on the loss function value.

The audio encoder may be further configured for receiving a currently-input audio signal, for encoding the currently-input audio signal in a compressed audio format and for outputting an encoded audio signal in the compressed audio format.

In some implementations, a disclosed system may include an audio decoding apparatus. The audio decoding apparatus may include an interface system and a control system comprising one or more processors and one or more non-transitory storage media operatively coupled to the one or more processors. The control system may be configured to implement an audio decoder.

The audio decoder may include a neural network that has been trained according to a process that involves receiving, by the neural network and via the interface system, an input training audio signal and generating, by the neural network and based on the input training audio signal, an encoded training audio signal. The process may involve decoding, via the control system, the encoded training audio signal to produce a decoded training audio signal and receiving, by a loss function generating module that is implemented via the control system, the decoded training audio signal and a ground truth audio signal. The process may involve generating, by the loss function generating module, a loss function value corresponding to the decoded training audio signal. Generating the loss function value may involve applying a psychoacoustic model. The process may involve training the neural network based on the loss function value.

The audio decoder may be further configured for receiving a currently-input encoded audio signal in a compressed audio format, for decoding the currently-input encoded audio signal in a decompressed audio format and for outputting a decoded audio signal in the decompressed audio format. According to some implementations, the system may include one or more transducers configured for reproducing the decoded audio signal.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings generally indicate like elements.

DESCRIPTION OF EXAMPLE EMBODIMENTS

Figure 1:
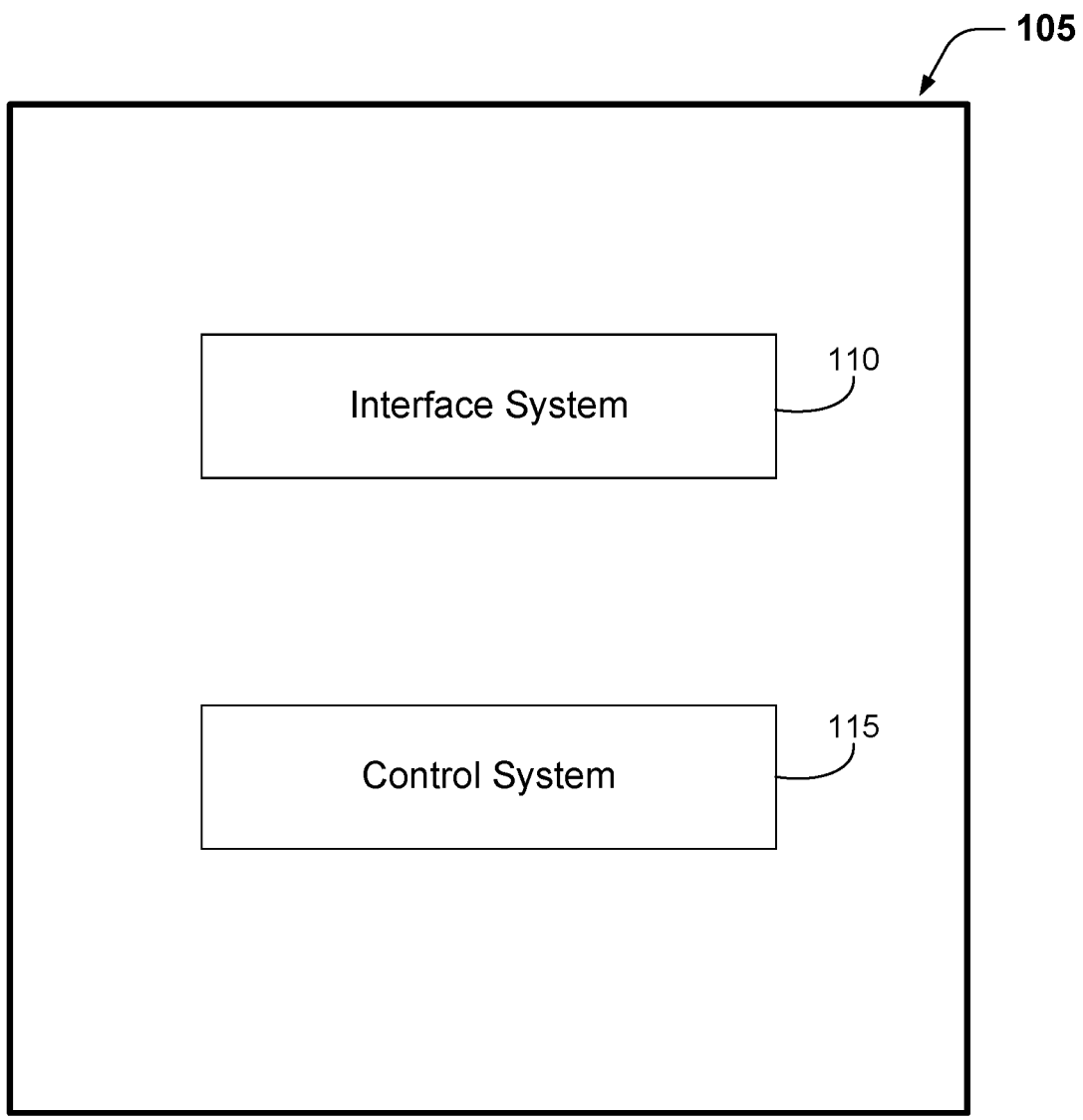
FIG. 1 is a block diagram that shows examples of components of an apparatus that may be configured to perform at least some of the methods disclosed herein.

The following description is directed to certain implementations for the purposes of describing some innovative aspects of this disclosure, as well as examples of contexts in which these innovative aspects may be implemented. However, the teachings herein can be applied in various different ways. Moreover, the described embodiments may be implemented in a variety of hardware, software, firmware, etc. For example, aspects of the present application may be embodied, at least in part, in an apparatus, a system that includes more than one device, a method, a computer program product, etc. Accordingly, aspects of the present application may take the form of a hardware embodiment, a software embodiment (including firmware, resident software, microcodes, etc.) and/or an embodiment combining both software and hardware aspects. Such embodiments may be referred to herein as a "circuit," a "module" or "engine." Some aspects of the present application may take the form of a computer program product embodied in one or more non-transitory media having computer readable program code embodied thereon. Such non-transitory media may, for example, include a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Accordingly, the teachings of this disclosure are not intended to be limited to the implementations shown in the figures and/or described herein, but instead have wide applicability.

The present inventors have researched various methods of machine learning that is related to audio data processing, including but not limited to audio data encoding and decoding. In particular, the present inventors have researched various methods of training different types of neural networks using loss functions that are relevant to the manner in which human beings perceive sound. The effectiveness of each of these loss functions was evaluated according to audio data produced by neural network encoding. The audio data was evaluated according to objective and subjective criteria. In some examples, audio data processed by a neural network that had been trained by using a loss function based on mean squared error was used as a basis for evaluating audio data produced according to the methods disclosed herein. In some instances, the process of evaluation via subjective criteria involved having human listeners evaluate the resulting audio data and obtaining the listeners' feedback.

The techniques disclosed herein are based on the above-referenced research. This disclosure provides various examples of using perceptually-based loss functions for training a neural network for audio data encoding and/or decoding. In some examples, the perceptually-based loss functions are based on a psychoacoustic model. The psychoacoustic model may, for example, be based at least in part on one or more psychoacoustic masking thresholds. In some examples, the psychoacoustic model may involve modeling an outer ear transfer function, grouping audio data into critical bands, frequency-domain masking (including but not limited to level-dependent spreading), modeling of a frequency-dependent hearing threshold and/or calculation of a noise-to-mask ratio. In some implementations, the loss function may involve calculating an average noise-to-masking ratio. In some such examples, the training process may involve minimizing the average noise-to-masking ratio.

FIG. 1 is a block diagram that shows examples of components of an apparatus that may be configured to perform at least some of the methods disclosed herein. In some examples, the apparatus 105 may be, or may include, a personal computer, a desktop computer or other local device that is configured to provide audio processing. In some examples, the apparatus 105 may be, or may include, a server. According to some examples, the apparatus 105 may be a client device that is configured for communication with a server, via a network interface. The components of the apparatus 105 may be implemented via hardware, via software stored on non-transitory media, via firmware and/or by combinations thereof. The types and numbers of components shown in FIG. 1, as well as other figures disclosed herein, are merely shown by way of example. Alternative implementations may include more, fewer and/or different components.

In this example, the apparatus 105 includes an interface system 110 and a control system 115. The interface system 110 may include one or more network interfaces, one or more interfaces between the control system 115 and a memory system and/or one or more external device interfaces (such as one or more universal serial bus (USB) interfaces). In some implementations, the interface system 110 may include a user interface system. The user interface system may be configured for receiving input from a user. In some implementations, the user interface system may be configured for providing feedback to a user. For example, the user interface system may include one or more displays with corresponding touch and/or gesture detection systems. In some examples, the user interface system may include one or more microphones and/or speakers. According to some examples, the user interface system may include apparatus for providing haptic feedback, such as a motor, a vibrator, etc. The control system 115 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some examples, the apparatus 105 may be implemented in a single device. However, in some implementations, the apparatus 105 may be implemented in more than one device. In some such implementations, functionality of the control system 115 may be included in more than one device. In some examples, the apparatus 105 may be a component of another device.

Figure 2:
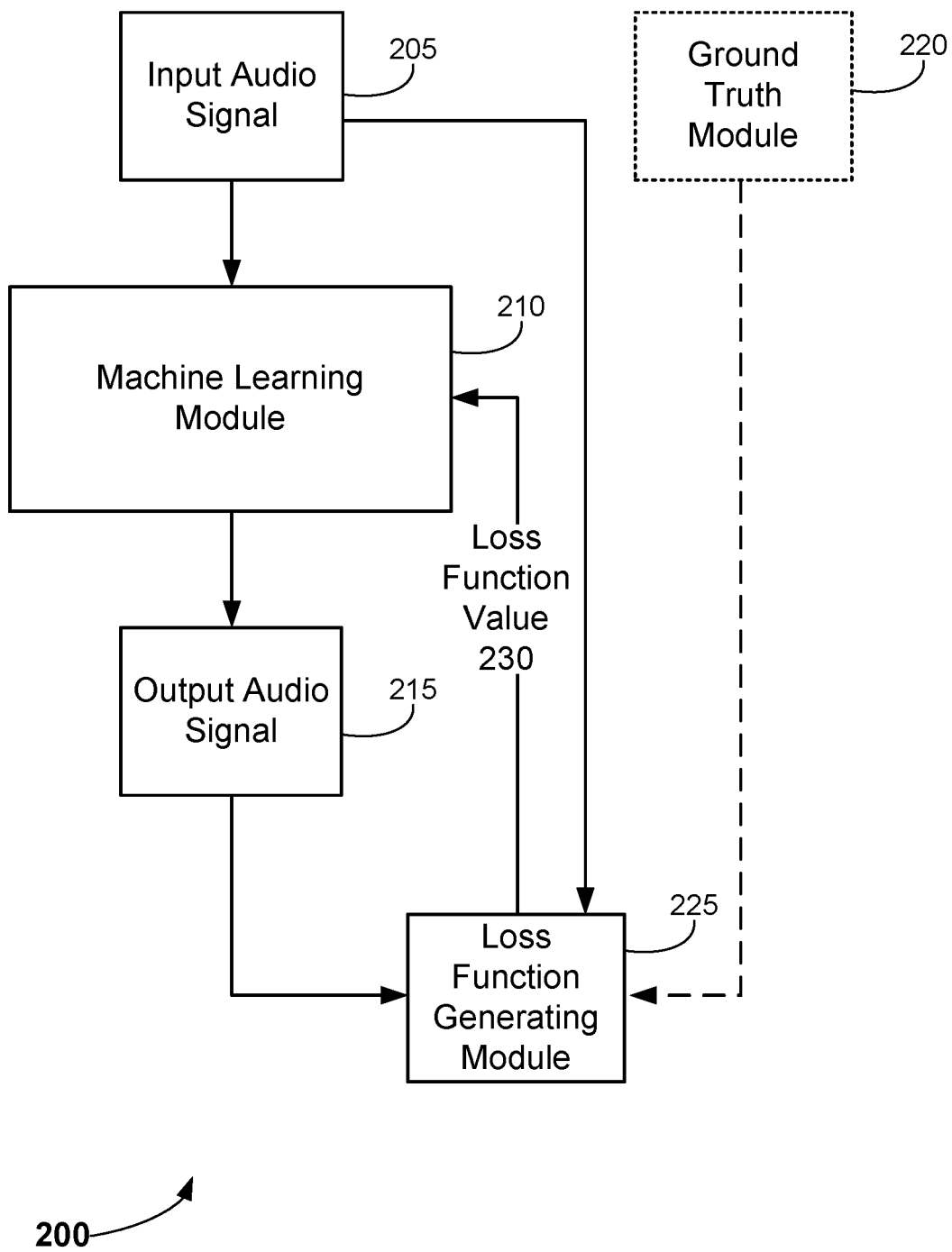
FIG. 2 shows blocks for implementing a process of machine learning according to a perceptually-based loss function according to one example.

FIG. 2 shows blocks for implementing a process of machine learning according to a perceptually-based loss function according to one example. In this example, an input audio signal 205 is provided to a machine learning module 210. The input audio signal 205 may, in some examples, correspond with human speech. However, in other examples the input audio signal 205 may correspond to other sounds, such as music, etc.

According to some examples, the elements of the system 200, including but not limited to the machine learning module 210, may be implemented via one or more control systems such as the control system 115. The machine learning module 210 may, for example, receive the input audio signal 205 via an interface system such as the interface system 110. In some instances, the machine learning module 210 may be configured to implement one or more neural networks, such as the neural networks disclosed herein. However, in other implementations the machine learning module 210 may be configured to implement one or more other types of machine learning, such as Non-negative Matrix Factorization, Robust Principal Component Analysis, Sparse Coding, Probabilistic Latent Component Analysis, etc.

In the examples shown in FIG. 2, the machine learning module 210 provides the output audio signal 215 to the loss function generating module 220. The loss function generating module 225 and the optional ground truth module 220 may, for example, be implemented via a control system such as the control system 115. In some examples the loss function generating module 225, the machine learning module 210 and the optional ground truth module 220 may be implemented via the same device, whereas in other examples the loss function generating module 225, the optional ground truth module 220 and the machine learning module 210 may be implemented via different devices.

According to this example, the loss function generating module 225 receives the input audio signal 205 and uses the input audio signal 205 as the "ground truth" for error determination. However, in some alternative implementations the loss function generating module 225 may receive ground truth data from the optional ground truth module 220. Such implementations may, for example, involve tasks such as speech enhancement or speech de-noising, in which the growth truth is not the original input audio signal. Whether the ground truth data is the input audio signal 205 or data that is received from the optional ground truth module, the loss function generating module 225 evaluates the output audio signal according to a loss function algorithm and the ground truth data, and provides a loss function value 230 to the machine learning module 210. In some such implementations, the machine learning module 210 includes an implementation of the optimizer module 315, which is described below with reference to FIG. 3. In other examples, the system 200 includes an implementation of the optimizer module 315 that is separate from, but in communication with, the machine learning module 210 and the loss function generating module 225. Various examples of loss functions are disclosed herein. In this example, the loss function generating module 225 applies a perceptually-based loss function, which may be based on a psychoacoustic model. According to this example, the process of machine learning that is implemented via the machine learning module 210 (for example, the process of training a neural network) is based, in part, on the loss function value 230.

The employment of the perceptually-based loss function, such as a loss function that is based on a psychoacoustic model, for machine learning (e.g., for training a neural network) can increase the perceptual quality of the output audio signal 215, as compared to the perceptual quality of an output audio signal produced by machine learning processes using traditional loss functions based on a mean squared error (MSE), an L1-norm, etc. For example, a neural network trained for a given length of time via a loss function based on a psychoacoustic model can increase the perceptual quality of the output audio signal 215, as compared to the perceptual quality of an output audio signal produced by a neural network having the same architecture that has been trained via a loss function based on MSE for the same length of time. Moreover, a neural network that is trained to convergence via a loss function based on a psychoacoustic model will generally produce an output audio signal a higher perceptual quality than the output audio signal of a neural network having the same architecture that has been trained to convergence via a loss function based on MSE.

Some disclosed loss functions take advantage of psychoacoustic principles to determine which differences in the output audio signal 215 will be audible to an average person and which will not be not be audible to an average person. In some examples, a loss function that is based on a psychoacoustic model may employ psychoacoustic phenomena such as time masking, frequency masking, equal loudness curves, level dependent masking, and/or human hearing thresholds. In some implementations, the perceptual loss function may operate in the time domain, whereas in other implementations the perceptual loss function may operate in the frequency domain. In alternative implementations the perceptual loss function may involve both time-domain and frequency-domain operations. In some examples, the loss function may use one-frame inputs to calculate the loss function, whereas in other examples the loss function may use multiple input frames to calculate the loss function.

Figure 3:
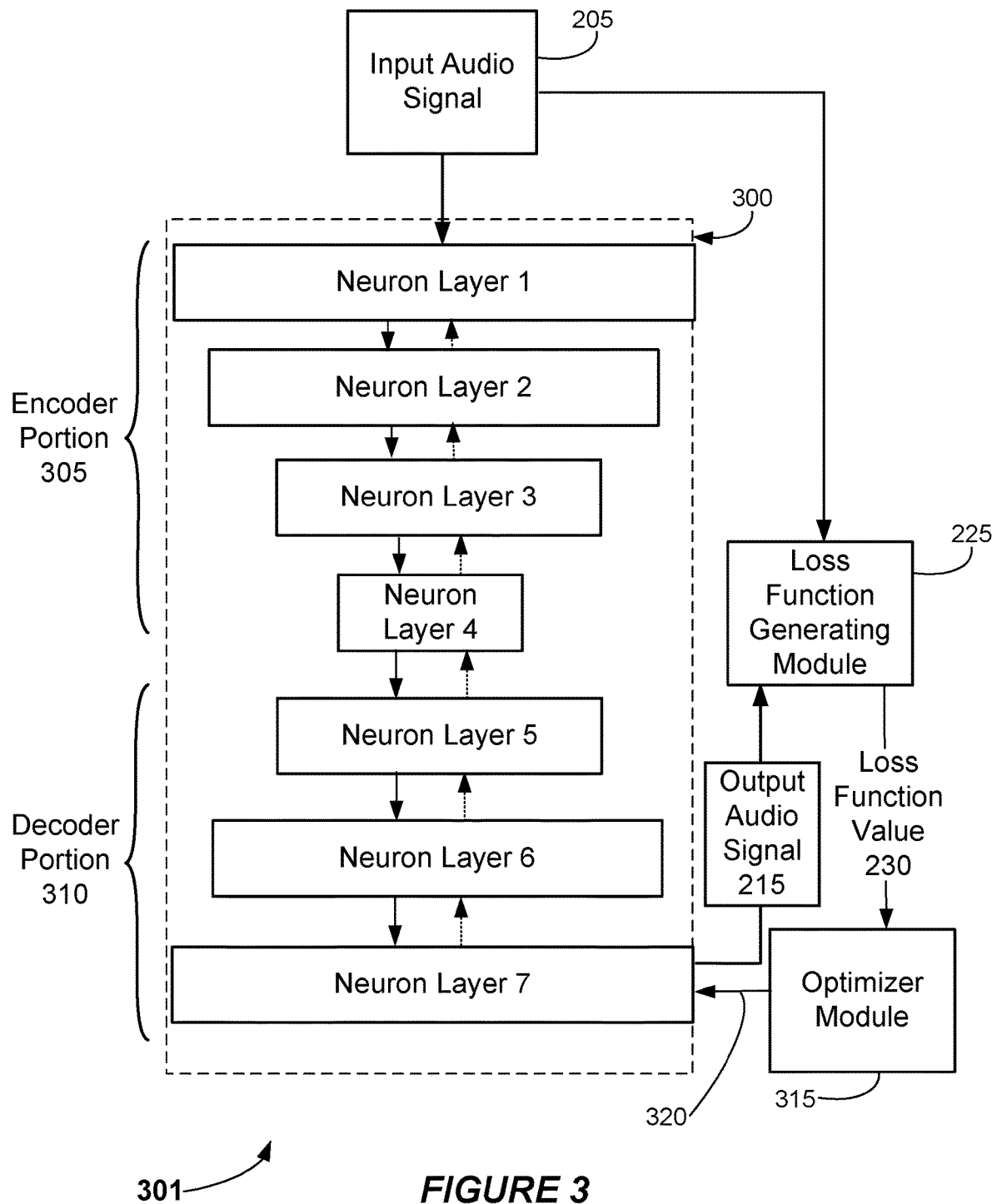
FIG. 3 shows an example of a neural network training process according to some implementations disclosed herein.

FIG. 3 shows an example of a neural network training process according to some implementations disclosed herein. As with other figures provided herein, the numbers and types of elements are merely made by way of example. According to some examples, the elements of the system 301 may be implemented via one or more control systems such as the control system 115. In the example shown in FIG. 3, the neural network 300 is an autoencoder. Techniques for designing an autoencoder are described in chapter 14 of Goodfellow, Ian, Yoshua Bengio, and Aaron Courville, *Deep Learning* (MIT Press, 2016), which is hereby incorporated by reference.

The neural network 300 includes layers of nodes, which are also referred to herein as "neurons." Each neuron has a real-valued activation function, whose output is commonly referred to as an "activation," which defines the output of that neuron given an input or set of inputs. According to some examples, neurons of the neural network 300 may employ sigmoidal activation functions, ELU activation functions and/or tanh activation functions. Alternatively, or additionally, neurons of the voice neural network 300 may employ rectified linear unit (ReLU) activation functions.

Each connection (also referred to as a "synapse") between neurons has a modifiable real-valued weight. A neuron may be an input neuron (receiving data from outside the network), an output neuron, or a hidden neuron that modifies the data en route from an input neuron to an output neuron. In the example shown in FIG. 3, the neurons in Neuron Layer 1 are input neurons, the neurons in Neuron Layer 7 are output neurons and the neurons in Neuron Layers 2-6 are hidden neurons. Although five hidden layers are shown in FIG. 3, some implementations may include more or fewer hidden layers. Some implementations of the neural network 300 may include more or fewer hidden layers, e.g., 10 or more hidden layers. For example, some implementations may include 10, 20, 30, 40, 50, 60, 70, 80, 90 or more hidden layers.

Here, a first portion of the neural network 300 (the encoder portion 305) is configured to generate an encoded audio signal and a second portion of the neural network 300 (the decoder portion 310) is configured to decode the encoded audio signal. In this example, the encoded audio signal is a compressed audio signal and the decoded audio signal is a decompressed audio signal. Accordingly, the input audio signal 205 is compressed by the encoder portion 305, as suggested by the decreasing sizes of the blocks that are used to illustrate neuron layers 1-4. In some examples, the input neuron layer may include more neurons than at least one of the hidden neuron layers of the encoder portion 305. However, in alternative implementations the neuron layers 1-4 may all have the same number of neurons, or substantially similar numbers of neurons.

Accordingly, the compressed audio signal provided by the encoder portion 305 is then decoded via the neuron layers of the decoder portion 310 to construct the output signal 215, which is an estimate of the input audio signal 205. A perceptual loss function, such as a psychoacoustically-based loss function, may then be used to determine updates for parameters of the neural network 300 during the training phase. These parameters can subsequently be used to decode (e.g., to decompress) any audio signals that have been encoded (e.g., compressed) using the weights determined by the parameters received from the training algorithm. In other words, encoding and decoding may be done separately from the training process after satisfactory weights are determined for the neural network 300.

According to this example, the loss function generating module 225 receives the at least a portion of the audio input signal 205 and uses this as ground truth data. Here, the loss function generating module 225 evaluates the output audio signal according to a loss function algorithm and the ground truth data, and provides a loss function value 230 to the optimizer module 315. In this example, the optimizer module 315 is initialized with information about the neural network and the loss function(s) used by the loss function generating module 225. According to this example, the optimizer module 315 uses that information, along with the loss value that the optimizer module 315 receives from the loss function generating module 225, to compute the gradient of the loss function with respect to the neural network's weights. Once this gradient is known, the optimizer module 315 uses an optimization algorithm to generate updates 320 to the neural network's weights. According to some implementations, the optimizer module 315 may employ an optimization algorithm such as Stochastic Gradient Descent or the Adam optimization algorithm. The Adam optimization algorithm is disclosed in D. P. Kingma and J. L. Ba, "Adam: a Method for Stochastic Optimization," in Proceedings of the International Conference on Learning Representations (ICLR), 2015, pp. 1-15, which is hereby incorporated by reference. In the example shown in FIG. 3, the optimizer module 315 is configured to provide the updates 320 to the neural network 300. In this example, the loss function generating module 225 applies a perceptually-based loss function, which may be based on a psychoacoustic model. According to this example, the process of training the neural network 300 is based, at least in part, on backward propagation. This backward propagation is indicated in FIG. 3 by the stippled arrows between the neuron layers. Backward propagation (also known as "backpropagation") is a method used in neural networks to calculate the error contribution of each neuron after a batch of data is processed. The backpropagation technique is also sometimes called backward propagation of errors, because the error may be calculated at the output and distributed back through the neural network layers.

The neural network 300 may be implemented by a control system such as the control system 115 that is described above with reference to FIG. 1. Accordingly, training the neural network 300 may involve changing the physical state of non-transitory storage medium locations corresponding to the weights in the neural network 300. The storage medium locations may be parts of one or more storage media that are accessible by, or part of, the control system. The weights, as noted above, correspond to connections between neurons. Training the neural network 300 also may involve changing the physical state of non-transitory storage medium locations corresponding to the values of the neurons' activation functions.

Figures 4A, 4B, 4C:
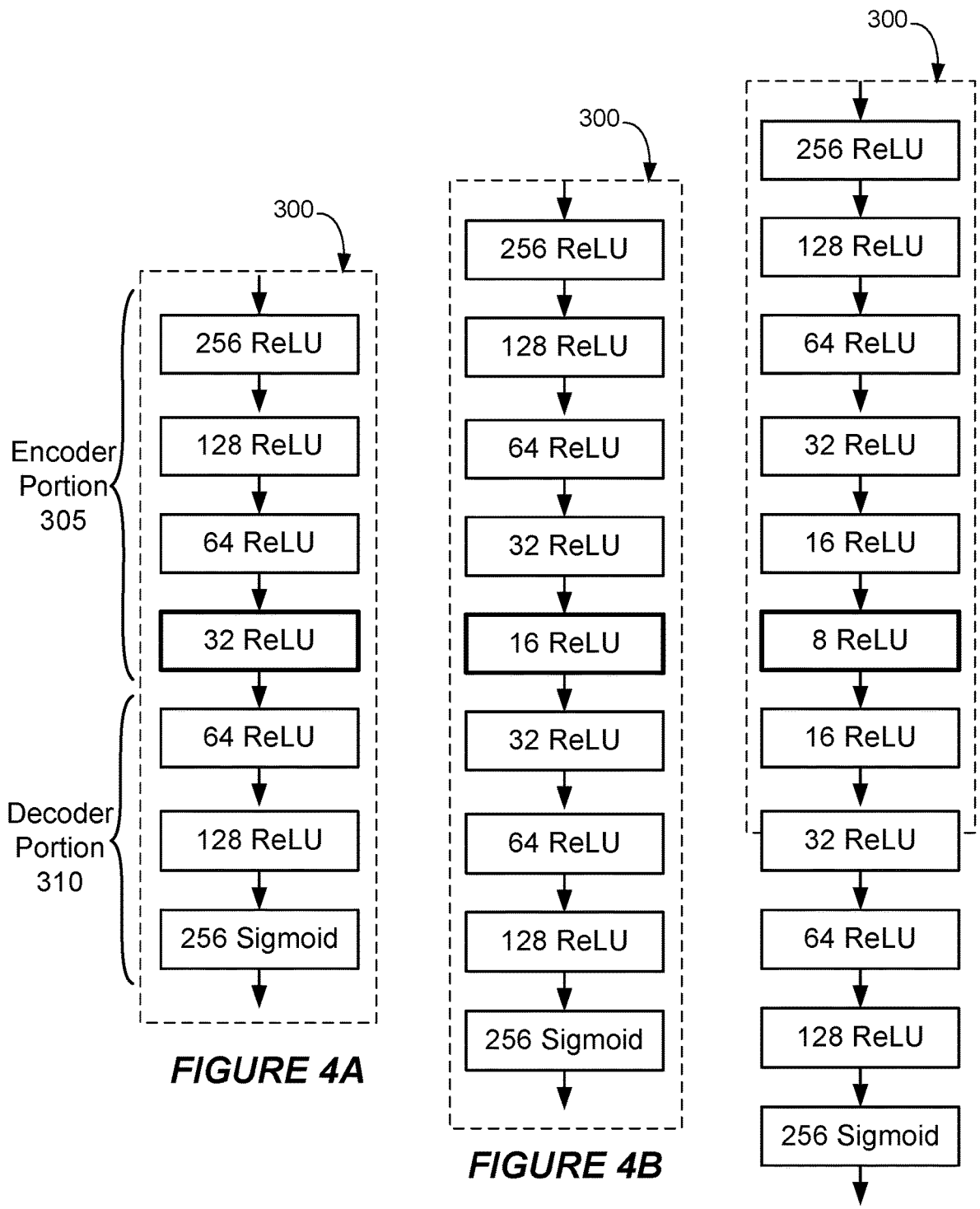
FIGS. 4A-4D show alternative examples of neural networks that are suitable for implementing some of the methods disclosed herein.

FIGS. 4A-4C show alternative examples of neural networks that are suitable for implementing some of the methods disclosed herein. According to these examples, the input neurons and the hidden neurons employ rectified linear unit (ReLU) activation functions, whereas the output neurons employ sigmoidal activation functions. However, alternative implementations of the neural network 300 may include other activation functions and/or other combinations of activation functions, including but not limited to Exponential Linear Unit (ELU) and/or tanh activation functions.

According to these examples, the input audio data is 256-dimensional audio data. In the example shown in FIG. 4A, the encoder portion 305 compresses the input audio data to 32-dimensional audio data, providing up to an 8× reduction. According to the example shown in FIG. 4B, the encoder portion 305 compresses the input audio data to 16-dimensional audio data, providing up to a 16× reduction. The neural network 300 that is illustrated in FIG. 4C includes an encoder portion 305 that compresses the input audio data to 8-dimensional audio data, providing up to a 32× reduction. The present inventors conducted listening tests based on the type of neural network that is illustrated in FIG. 4B, some results of which are described below.

Figure 4D:
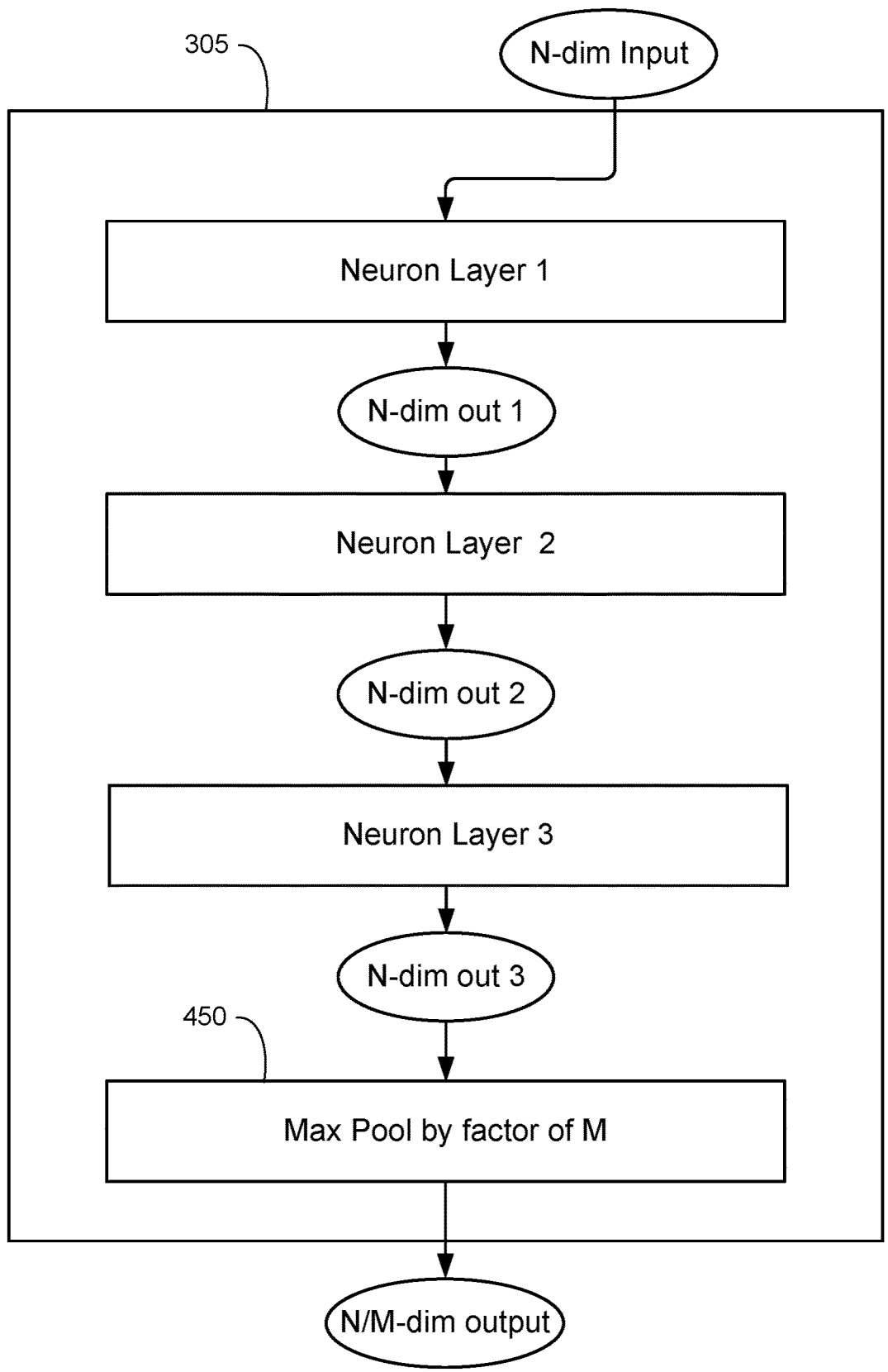

FIG. 4D shows an example of blocks of an encoder portion of an autoencoder according to an alternative example. The encoder portion 305 may, for example, be implemented by a control system such as the control system 115 that is described above with reference to FIG. 1. The encoder portion 305 may, for example, be implemented by one or more processors of the control system according to software stored in one or more non-transitory storage media. The numbers and types of elements shown in FIG. 4D are merely examples. Other implementations of the encoder portion 305 may include more, fewer or different elements.

In this example, the encoder portion 305 includes three layers of neurons. According to some examples, neurons of the encoder portion 305 may employ ReLU activation functions. However, according to some alternative examples, neurons of the encoder portion 305 may employ sigmoidal activation functions and/or tanh activation functions. The neurons in Neuron Layers 1-3 process the N-dimensional input data while maintaining its N-dimensional state. The layer 450 is configured to receive the output of Neuron Layer 3 and apply a pooling algorithm. Pooling is a form of non-linear down-sampling. According to this example, the layer 450 is configured to apply a max pooling function that partitions the output of Neuron Layer 3 into a set of M non-overlapping portions or "sub-regions" and, for each such sub-region, outputs the maximum value.

Figure 5A:
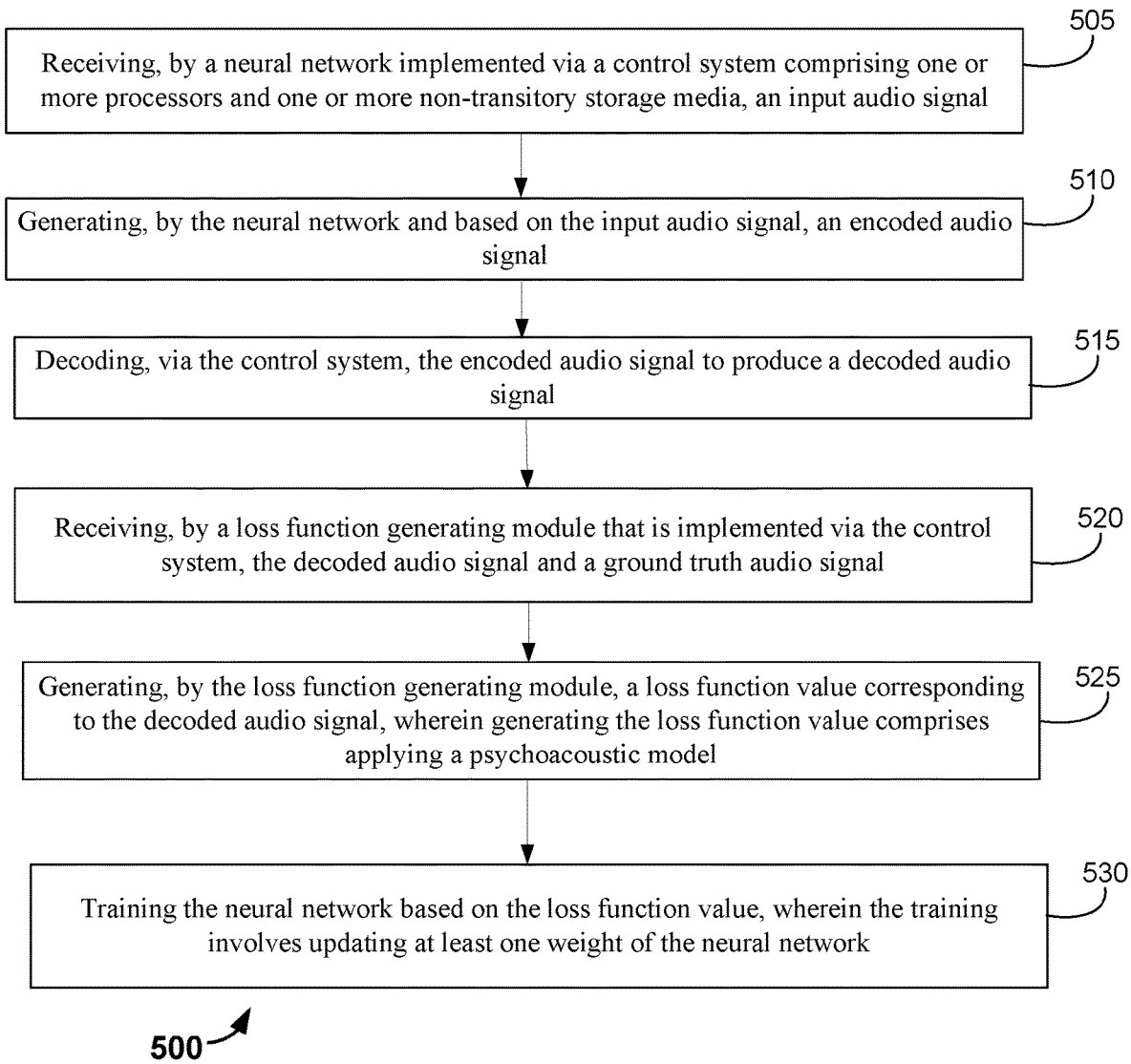
FIG. 5A is a flow diagram that outlines blocks of a method of training a neural network for audio encoding and decoding according to one example.

FIG. 5A is a flow diagram that outlines blocks of a method of training a neural network for audio encoding and decoding according to one example. The method 500 may, in some instances, be performed by the apparatus of FIG. 1 or by another type of apparatus. In some examples, the blocks of method 500 may be implemented via software stored on one or more non-transitory media. The blocks of method 500, like other methods described herein, are not necessarily performed in the order indicated. Moreover, such methods may include more or fewer blocks than shown and/or described.

Here, block 505 involves receiving, by a neural network implemented via a control system comprising one or more processors and one or more non-transitory storage media, an input audio signal. In some examples, the neural network may be, or may include, an autoencoder. According to some examples, block 505 may involve the control system 115 of FIG. 1 receiving the input audio signal via the interface system 110. In some examples, block 505 may involve the neural network 300 receiving the input audio signal 205, as described above with reference to FIGS. 2-4C. In some implementations, the input audio signal 205 may include at least a portion of a speech dataset, such as the publicly available speech dataset known as TIMIT. TIMIT is a dataset of phonemically and lexically transcribed speech of American English speakers of different sexes and dialects. TIMIT was commissioned by the Defense Advanced Research Projects Agency (DARPA). The corpus design of TIMIT was a joint effort between Texas Instruments (TI), the Massachusetts Institute of Technology (MIT) and SRI International. According to some examples, method 500 may involve transforming the input audio signal 205 from the time domain to the frequency domain, e.g., via a fast Fourier transform (FFT), a discrete cosine transform (DCT) or a short-time Fourier transform (STFT). In some implementations, min/max scaling may be applied to the input audio signal 205 prior to block 510.

According to this example, block 510 involves generating, by the neural network and based on the input audio signal, an encoded audio signal. The encoded audio signal may be, or may include, a compressed audio signal. Block 510 may, for example, be performed by an encoder portion of the neural network, such as the encoder portion 305 of the neural network 300 described herein. However, in other examples block 510 may involve generating an encoded audio signal via an encoder that is not part of the neural network. In some such examples, a control system that implements the neural network also may include an encoder that is not part of the neural network. For example, the neural network may include a decoding portion but not an encoding portion.

In this example, block 515 involves decoding, via the control system, the encoded audio signal to produce a decoded audio signal. The decoded audio signal may be, or may include, a decompressed audio signal. In some implementations, block 515 may involve producing decoded transform coefficients. Block 515 may, for example, be performed by a decoder portion of the neural network, such as the decoder portion 310 of the neural network 300 described herein. However, in other examples block 510 may involve generating a decoded audio signal and/or decoded transform coefficients via a decoder that is not part of the neural network. In some such examples, a control system that implements the neural network also may include a decoder that is not part of the neural network. For example, the neural network may include an encoding portion but not a decoding portion.

Accordingly, in some implementations a first portion of the neural network may be configured to generate the encoded audio signal and a second portion of the neural network may be configured to decode the encoded audio signal. In some such implementations, the first portion of the neural network may include an input neuron layer and a plurality of hidden neuron layers. In some examples, the input neuron layer may include more neurons than at least one of the hidden neuron layers of the first portion. However, in alternative implementations the input neuron layer may have the same number of neurons, or substantially similar numbers of neurons, as the hidden neuron layers of the first portion.

According to some examples, at least some neurons of the first portion of the neural network may be configured with rectified linear unit (ReLU) activation functions. In some implementations, at least some neurons in hidden layers of the second portion of the neural network may be configured with rectified linear unit (ReLU) activation functions. According to some such implementations, at least some neurons in an output layer of the second portion may be configured with sigmoidal activation functions.

In some implementations, block 520 may involve receiving, by a loss function generating module that is implemented via the control system, the decoded audio signal and/or the decoded transform coefficients, and a ground truth signal. The ground truth signal may, for example, include a ground truth audio signal and/or ground truth transform coefficients. In some such examples, the ground truth signal may be received from a ground truth module, such as the ground truth module 220 that is shown in FIG. 2 and described above. However, in some implementations the ground truth signal may be (or may include) the input audio signal, or a portion of the input audio signal. The loss function generating module may, for example, be an instance of the loss function generating module 225 that is disclosed herein.

According to some implementations, block 525 may involve generating, by the loss function generating module, a loss function value corresponding to the decoded audio signal and/or the decoded transform coefficients. In some such implementations, generating the loss function value may involve applying a psychoacoustic model. In the example shown in FIG. 5A, block 530 involves training the neural network based on the loss function value. The training may involve updating at least one weight in the neural network. In some such examples, an optimizer such as the optimizer module 315 that is described above with reference to FIG. 3 may have been initialized with information about the neural network and the loss function(s) used by the loss function generating module 225. The optimizer module 315 may be configured to use that information, along with the loss function value that the optimizer module 315 receives from the loss function generating module 225, to compute the gradient of the loss function with respect to the neural network's weights. After computing the gradient, the optimizer module 315 may use an optimization algorithm to generate updates to the neural network's weights and to provide these updates to the neural network. Training the neural network may involve backward propagation based on the updates provided by the optimizer module 315. Techniques for detecting and addressing overfitting during the process of training a neural network are described in chapters 5 and 7 of Goodfellow, Ian, Yoshua Bengio, and Aaron Courville, *Deep Learning* (MIT Press, 2016), which are hereby incorporated by reference. Training the neural network may involve changing a physical state of at least one non-transitory storage medium location corresponding with at least one weight or at least one activation function value of the neural network.

The psychoacoustic model may vary according to the particular implementation. According to some examples, the psychoacoustic model may be based, at least in part, on one or more psychoacoustic masking thresholds. In some implementations, applying the psychoacoustic model may involve modeling an outer ear transfer function, grouping into critical bands, frequency-domain masking (including but not limited to level-dependent spreading), modeling of a frequency-dependent hearing threshold and/or calculation of a noise-to-mask ratio. Some examples are described below with reference to FIGS. 6-10B.

In some implementations, the loss function generating module's determination of a loss function may involve calculating a noise-to-masking ratio (NMR), such as an average NMR. The training process may involve minimizing the average NMR. Some examples are described below.

According to some examples, training the neural network may continue until the loss function is relatively "flat," such that the difference between a current loss function value and a prior loss function value (such as the previous loss function value) is at or below a threshold value. In the example shown in FIG. 5, training the neural network may involve repeating at least some of blocks 505 through 535 until a difference between a current loss function value and a prior loss function value is less than or equal to a predetermined value.

Figure 5B:
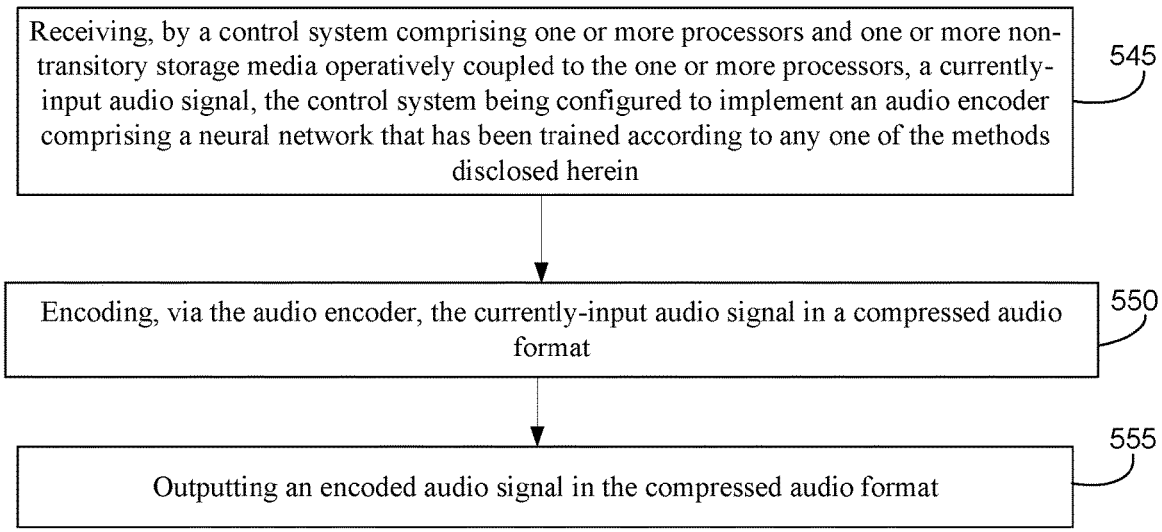
FIG. 5B is a flow diagram that outlines blocks of a method of using a trained neural network for audio encoding according to one example.

After the neural network has been trained, the neural network (or a portion thereof) may be used for processing audio data, e.g., for encoding or for decoding audio data. FIG. 5B is a flow diagram that outlines blocks of a method of using a trained neural network for audio encoding according to one example. The method 540 may, in some instances, be performed by the apparatus of FIG. 1 or by another type of apparatus. In some examples, the blocks of method 540 may be implemented via software stored on one or more non-transitory media. The blocks of method 540, like other methods described herein, are not necessarily performed in the order indicated. Moreover, such methods may include more or fewer blocks than shown and/or described.

In this example, block 545 involves receiving a currently-input audio signal. In this example block 545 involves receiving the currently-input audio signal by a control system that includes one or more processors and one or more non-transitory storage media operatively coupled to the one or more processors. Here, the control system is configured to implement an audio encoder comprising a neural network that has been trained according to one or more of the methods disclosed herein.

In some examples, the training process may involve: receiving, by the neural network and via the interface system, an input training audio signal; generating, by the neural network and based on the input training audio signal, an encoded training audio signal; decoding, via the control system, the encoded training audio signal to produce a decoded training audio signal; receiving, by a loss function generating module that is implemented via the control system, the decoded training audio signal and a ground truth audio signal; generating, by the loss function generating module, a loss function value corresponding to the decoded training audio signal, wherein generating the loss function value comprises applying a psychoacoustic model; and training the neural network based on the loss function value.

According to this implementation, block 550 involves encoding, via the audio encoder, the currently-input audio signal in a compressed audio format. Here, block 555 involves outputting an encoded audio signal in the compressed audio format.

Figure 5C:
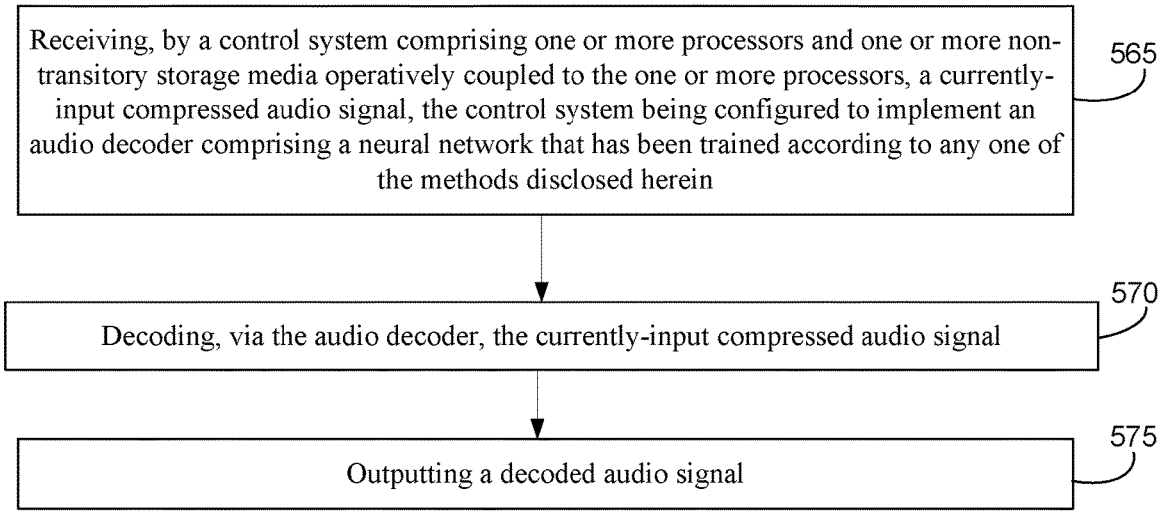
FIG. 5C is a flow diagram that outlines blocks of a method of using a trained neural network for audio decoding according to one example.

FIG. 5C is a flow diagram that outlines blocks of a method of using a trained neural network for audio decoding according to one example. The method 560 may, in some instances, be performed by the apparatus of FIG. 1 or by another type of apparatus. In some examples, the blocks of method 560 may be implemented via software stored on one or more non-transitory media. The blocks of method 560, like other methods described herein, are not necessarily performed in the order indicated. Moreover, such methods may include more or fewer blocks than shown and/or described.

In this example, block 565 involves receiving a currently-input compressed audio signal. In some such examples, the currently-input compressed audio signal may have been produced according to method 540 or by a similar method. In this example block 565 involves receiving the currently-input compressed audio signal by a control system that includes one or more processors and one or more non-transitory storage media operatively coupled to the one or more processors. Here, the control system is configured to implement an audio decoder comprising a neural network that has been trained according to one or more of the methods disclosed herein.

According to this implementation, block 570 involves decoding, via the audio decoder, the currently-input compressed audio signal. For example, block 570 may involve decompressing the currently-input compressed audio signal. Here, block 575 involves outputting a decoded audio signal. According to some examples, method 540 may involve reproducing the decoded audio signal via one or more transducers.

As noted above, the present inventors have researched various methods of training different types of neural networks using loss functions that are relevant to the manner in which human beings perceive sound. The effectiveness of each of these loss functions was evaluated according to audio data produced by neural network encoding. In some examples, audio data processed by a neural network that had been trained by using a loss function based on mean squared error (MSE) was used as a basis for evaluating audio data produced according to the methods disclosed herein.

Figure 6:
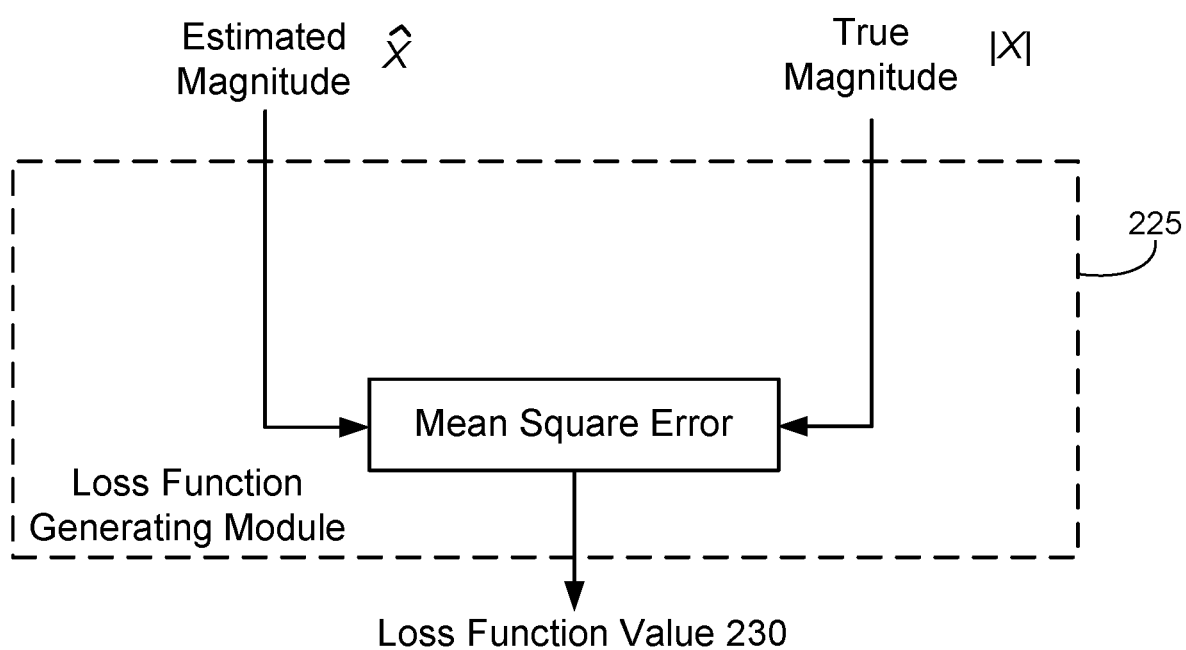
FIG. 6 is a block diagram that illustrates a loss function generating module that is configured to generate a loss function based on mean squared error.

FIG. 6 is a block diagram that illustrates a loss function generating module that is configured to generate a loss function based on mean squared error. Here, the estimated magnitude of an audio signal produced by a neural network and magnitude of a ground truth/true audio signal are both provided to a loss function generating module 225. The loss function generating module 225 generates a loss function value 230 based on the MSE value. The loss function value 230 may be provided to an optimizer module that is configured to generate updates to weights of the neural network for training.

Figure 7A:
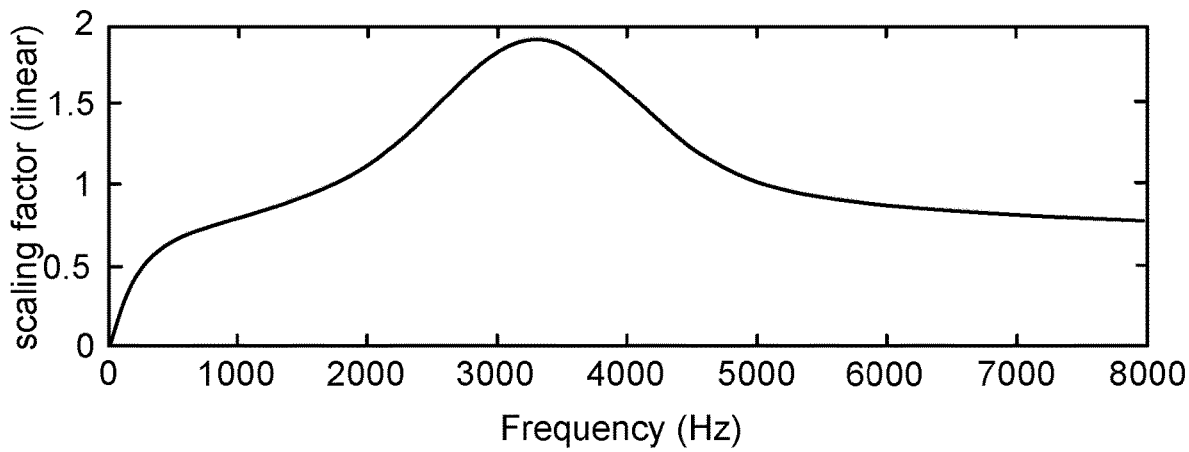
FIG. 7A is a graph of a function that approximates a typical acoustic response of a human ear canal.

The present inventors have evaluated some implementations of loss functions that are based, at least in part, on models of the acoustic response of one or more portions of the human ear, which also may be referred to as "ear models." FIG. 7A is a graph of a function that approximates a typical acoustic response of a human ear canal.

Figure 7B:
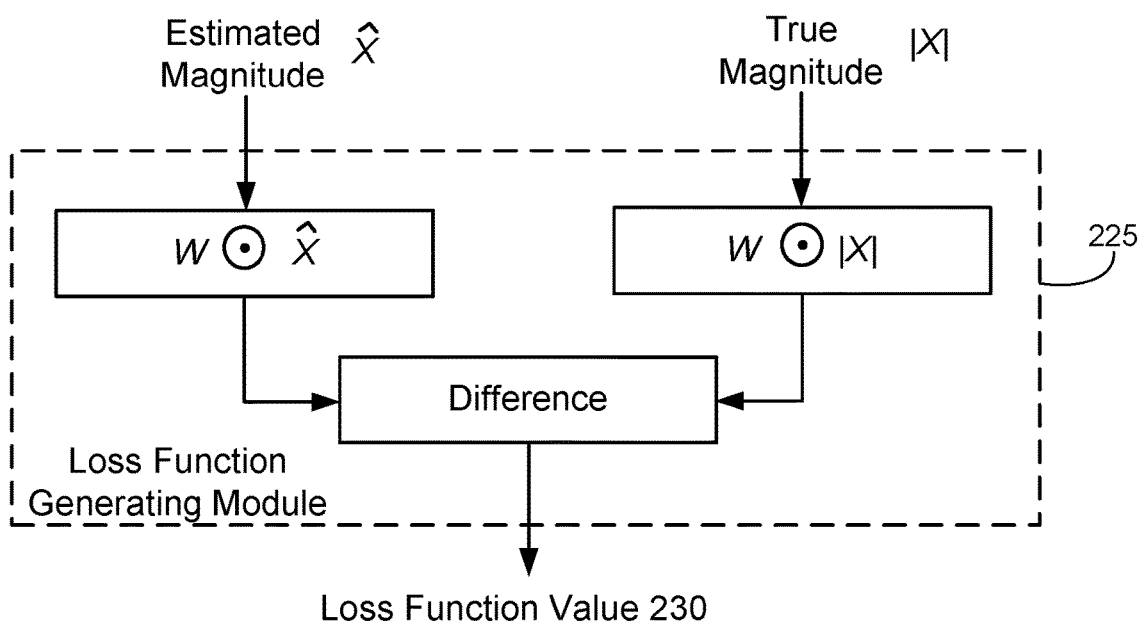
FIG. 7B illustrates a loss function generating module that is configured to generate a loss function based on the typical acoustic response of a human ear canal.

FIG. 7B illustrates a loss function generating module that is configured to generate a loss function based on the typical acoustic response of a human ear canal. In this example, a function W is applied to both an audio signal produced by a neural network and a ground truth/true audio signal.

In some examples, the function W may be as follows:

$$W(f) = -2.184 \left(\frac{f}{1000}\right)^{-0.8} + 6.5 \exp\left(-0.6\left(\frac{f}{1000} - 3.3\right)^2\right) - 0.001\left(\frac{f}{1000}\right)^{3.6} \quad \text{(Equation 1)}$$

Equation 1 has been used in an implementation of the Perceptual Evaluation of Audio Quality (PEAQ) algorithm for the purpose of modeling the acoustic response of a human ear canal. In Equation 1, f represents a frequency of the audio signal. In this example, the loss function generating module 225 generates a loss function value 230 based on the difference between the two resulting values. The loss function value 230 may be provided to an optimizer module that is configured to generate updates to weights of the neural network for training.

When compared to audio signals produced by a neural network trained according to a loss function based on MSE, the audio signals produced by training a neural network using a loss function such as that shown in FIG. 7B provided only slight improvements. For example, using an objective standard based on the Perceptual Objective Listening Quality Analysis (POLQA), the MSE-based audio data achieved a score of 3.41, whereas the audio data produced by training a neural network using a loss function such as that shown in FIG. 7B achieved a score of 3.48.

Figure 8:
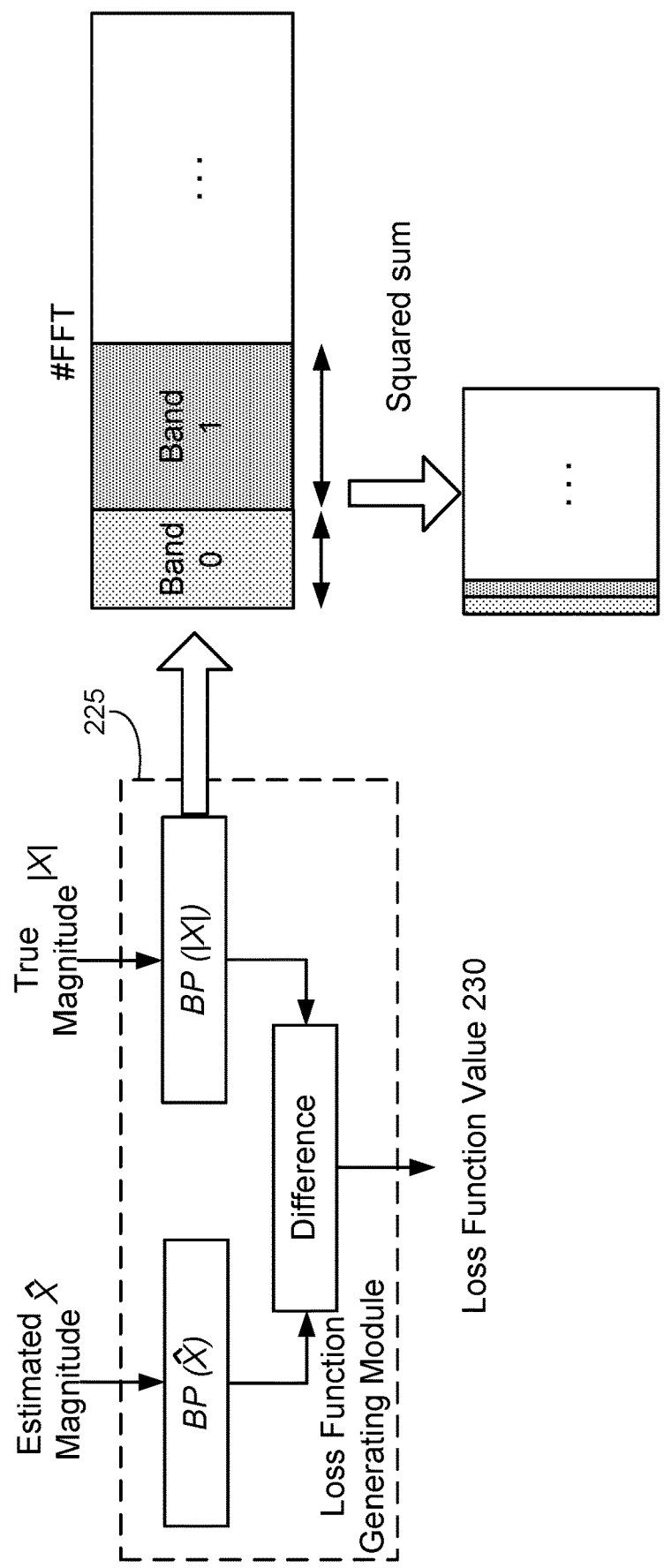
FIG. 8 illustrates a loss function generating module that is configured to generate a loss function based on banding operations.

In some experiments, the inventors tested audio signals produced by a neural network trained according to a loss function based on banding operations. FIG. 8 illustrates a loss function generating module that is configured to generate a loss function based on banding operations. In this example, the loss function generating module 225 is configured to perform banding operations on an audio signal produced by a neural network and a ground truth/true audio signal, and to calculate a difference between the results.

In some implementations, the banding operations were based on "Zwicker" bands, which are critical bands defined according to chapter 6 (Critical Bands and Excitation) of Fastl, H., & Zwicker, E. (2007), *Psychoacoustics: Facts and Models* (3rd ed., Springer), which is hereby incorporated by reference. In alternative implementations, the banding operations were based on "Moore" bands, which are critical bands defined according to chapter 3 (Frequency Selectivity, Masking, and the Critical Band) of Moore, B. C. J. (2012), *An Introduction to the Psychology of Hearing* (Emerald Group Publishing), which is hereby incorporated by reference. However, other examples may involve other types of banding operations known by those of skill in the art.

Based on their experiments, the inventors concluded that banding operations alone were unlikely to provide satisfactory results. For example, using an objective standard based on POLQA, the MSE-based audio data achieved a score of 3.41, whereas in one example the audio data produced by training a neural network using banding operations achieved a score of only 1.62.

Figure 9A:
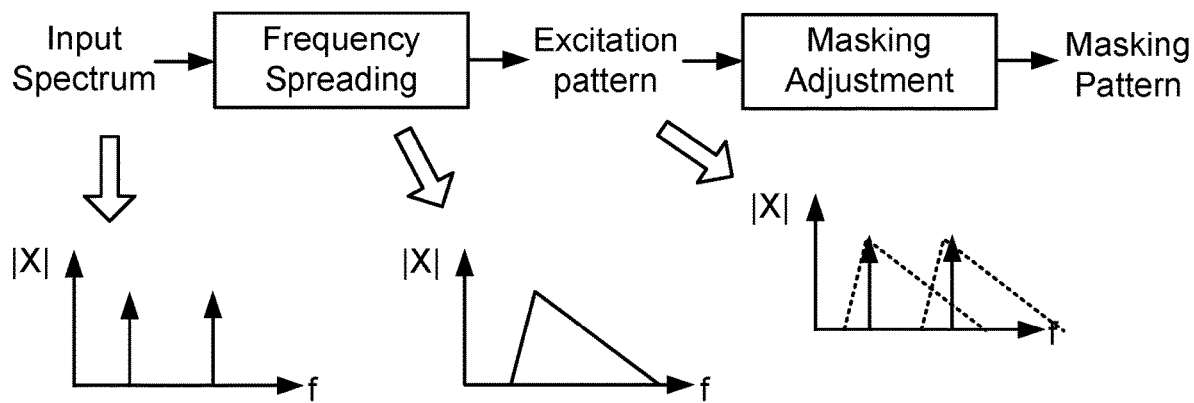
FIG. 9A illustrates processes involved in frequency masking according to some examples.

In some experiments, the inventors tested audio signals produced by a neural network trained according to loss functions based, at least in part, on frequency masking. FIG. 9A illustrates processes involved in frequency masking according to some examples. In this example, a spreading function is calculated in the frequency domain. This spreading function may, for example, be a level- and frequency-dependent function that can be estimated from the input audio data, e.g., from each input audio frame. A convolution with the frequency spectrum of the input audio may then be performed, which yields an excitation pattern. The result of the convolution between the input audio data and the spreading function is an approximation of how human auditory filters react to the excitations of the incoming sounds. Accordingly, the process is a simulation of the human hearing mechanism. In some implementations, the audio data is grouped into frequency bins and the convolution process involves convolving a spreading function for each frequency bin with the corresponding audio data for that frequency bin.

The excitation pattern may be adjusted to produce a masking pattern. In some examples, the excitation pattern may be adjusted downward, e.g., by 20 dB, to produce a masking pattern.

Figure 9B:
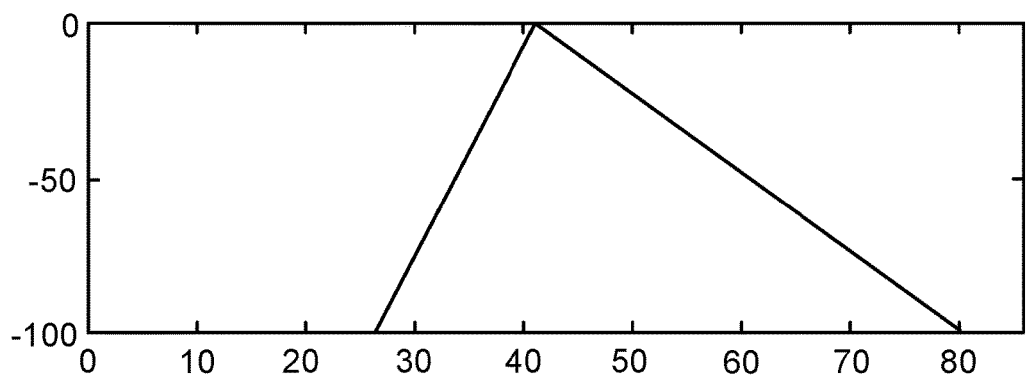
FIG. 9B illustrates an example of a spreading function.

FIG. 9B illustrates an example of a spreading function. According to this example, the spreading function is a simplified asymmetric triangular function that can be pre-computed for efficient implementation. In this simplified example, the vertical axis represents decibels and the horizontal axis represents Bark sub-bands. According to one such example, the spreading function is calculated as follows:

$$S_l = 27 \quad \text{(Equation 2)}$$

$$S_u = -24 - \frac{230}{fc} + 0.2*L \quad \text{(Equation 3)}$$

In Equations 2 and 3, $S_l$ represents the slope of the portion of the spreading function of FIG. 9B that is to the left of the peak frequency, whereas $S_u$ represents the slope of the portion of the spreading function that is to the right of the peak frequency. The slope units are dB/Bark. In Equation 3, $f_c$ represents the center or peak frequency of the spreading function and L represents the level or amplitude of the audio data. In some examples, L may be assumed to be constant, in order to simplify the calculation of the spreading function. According to some such examples, L may be 70 dB.

In some such implementations, the excitation patterns may be calculated as follows:

$$E = \left(SF^{0.4} \cdot BP^{0.4}\right)^{\frac{1}{0.4}} \quad \text{(Equation 4)}$$

In Equation 4, E represents the excitation function (also referred to herein as the excitation pattern), SF represents the spreading function and BP represents the banded pattern of frequency-binned audio data. In some implementations, the excitation pattern may be adjusted to produce a masking pattern. In some examples, the excitation pattern may be adjusted downward, e.g., by 20 dB, by 24 dB, by 27 dB, etc., to produce a masking pattern.

Figure 10:
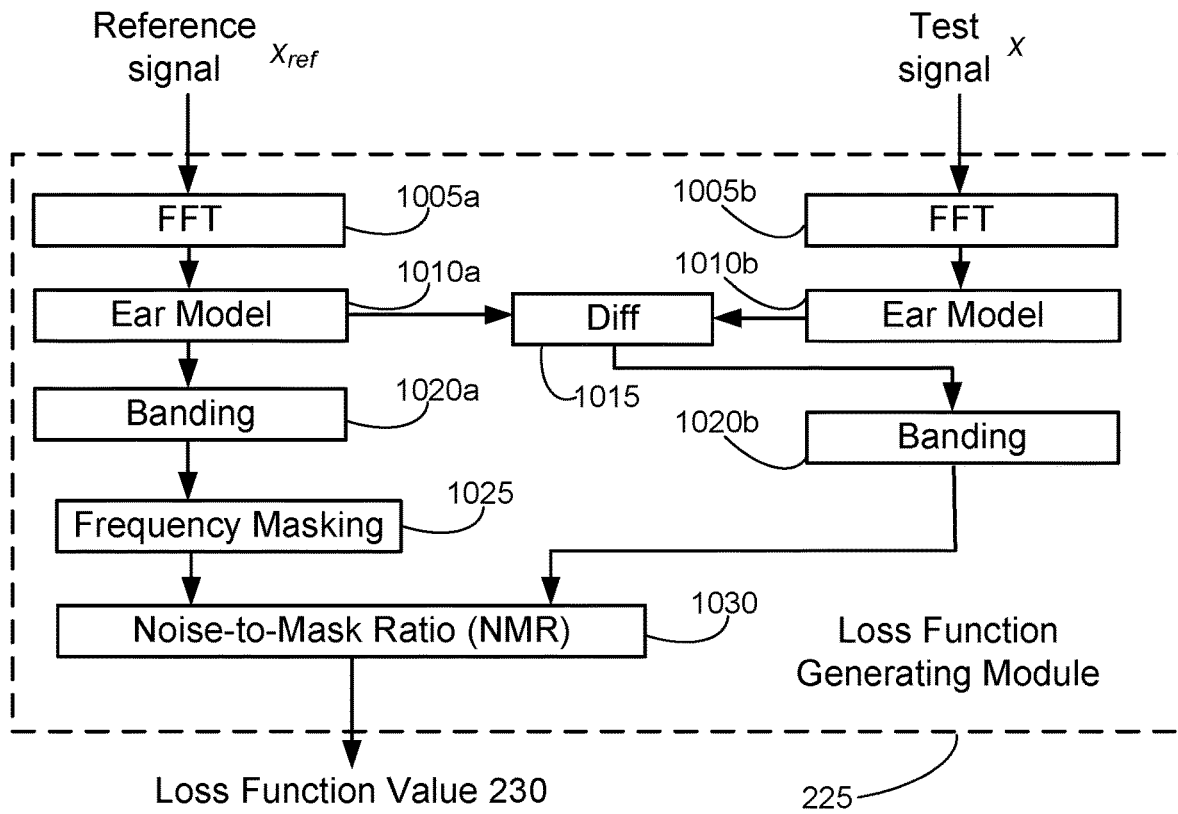
FIG. 10 shows one example of an alternative implementation of a loss function generating module.

FIG. 10 shows one example of an alternative implementation of a loss function generating module. The elements of the loss function generating module 225 may, for example, be implemented by a control system such as the control system 115 that is described above with reference to FIG. 1.

In this example, a reference audio signal $x_{ref}$, which is an instance of a ground truth signal referenced elsewhere herein, is provided to a fast Fourier transform (FFT) block 1005a of the loss function generating module 225. A test audio signal x, which has been produced by a neural network such as one of those disclosed herein, is provided to FFT block 1005b of the loss function generating module 225.

According to this example, the output of the FFT block 1005a is provided to the ear model block 1010a and the output of the FFT block 1005b is provided to the ear model block 1010b. The ear model blocks 1010a and 1010b may, for example, be configured to apply a function that is based on the typical acoustic response of one or more portions of a human ear. In one such example, the ear model blocks 1010a and 1010b may be configured to apply the function that is shown above in Equation 1.

According to this implementation, the output of the ear model blocks 1010a and 1010b is provided to the difference calculating block 1015, which is configured to compute the difference between the output of the ear model block 1010a and the output of the ear model block 1010b. The output of the difference calculating block 1015 may be regarded as an approximation of the noise that is in the test signal x.

In this example, the output of the ear model block 1010a is provided to the banding block 1020a and the output of the difference calculating block 1015 is provided to the banding block 1020b. The banding blocks 1020a and 1020b are configured to apply the same type of banding process, which may be one of the banding processes disclosed above (e.g., Zwicker or Moore banding processes). However, in alternative implementations the banding blocks 1020a and 1020*b* may be configured to apply any suitable banding process known by those of skill in the art.

The output of the banding block 1020*a* is provided to the frequency masking block 1025, which is configured to apply frequency masking operations. The masking block 1025 may, for example, be configured to apply one or more of the frequency masking operations disclosed herein. As noted above with reference to FIG. 9B, using a simplified frequency masking process can provide potential advantages. However, in alternative implementations the masking block 1025 may be configured to apply one or more other frequency masking operations known by those of skill in the art.

According to this example, the output of the masking block 1025 and the output of the banding block 1020*b* are both provided to the noise-to-mask ratio (NMR) calculating block 1030. As noted above, the output of the difference calculating block 1015 may be regarded as an approximation of the noise that is in the test signal x. Therefore, the output of the banding block 1020*b* may be regarded as a frequency-banded version of the noise that is in the test signal x. According to one example, the NMR calculating block 1030 may calculate the NMR as follows:

$$NMR = 10 \times \log 10\left(\frac{BP_{noise}}{MP}\right) \quad \text{(Equation 5)}$$

In Equation 5, $BP_{noise}$ represents the output of the banding block 1020*b* and MP represents the output of the masking block 1025. According to some examples, the NMR calculated by the NMR calculating block 1030 may be an average NMR across all frequency bands output by the banding blocks 1020*a* and 1020*b*. The NMR calculated by the NMR calculating block 1030 may be used as a loss function value 230 for training a neural network, e.g. as described above. For example, the loss function value 230 may be provided to an optimizer module that is configured to generate updated weights for the neural network.

Figure 11:
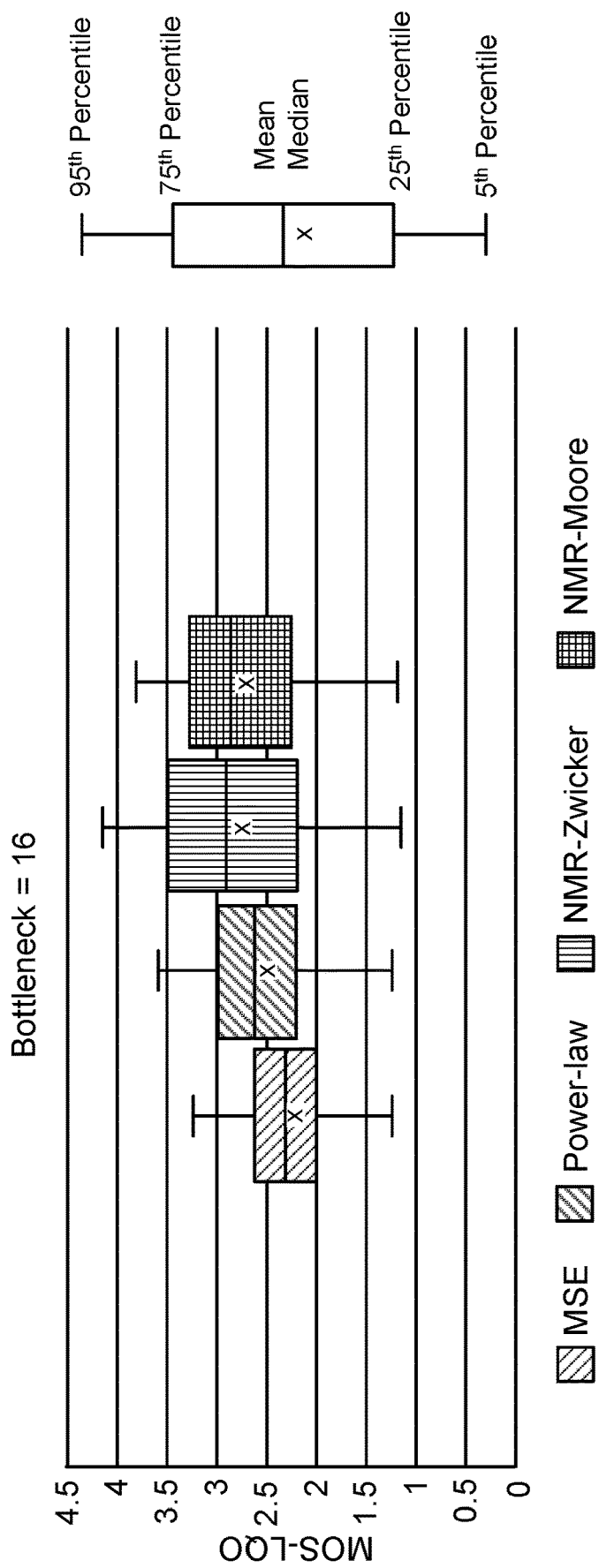
FIG. 11 shows an example of objective test results for some disclosed implementations.

FIG. 11 shows an example of objective test results for some disclosed implementations. FIG. 11 shows a comparison between PESQ scores of audio data produced by a neural network trained using loss functions based on MSE, power-law, NMR-Zwicker (NMR based on a banding process like that of the Zwicker banding process, but with bands that were fractionally narrower than those defined by Zwicker) and NMR-Moore (NMR based on a Moore banding process). These results, which are based on the output of the neural network described above with reference to FIG. 4B, show that the NMR-Zwicker and NMR-Moore results are both somewhat better than the MSE and power-law results.

Figure 12:
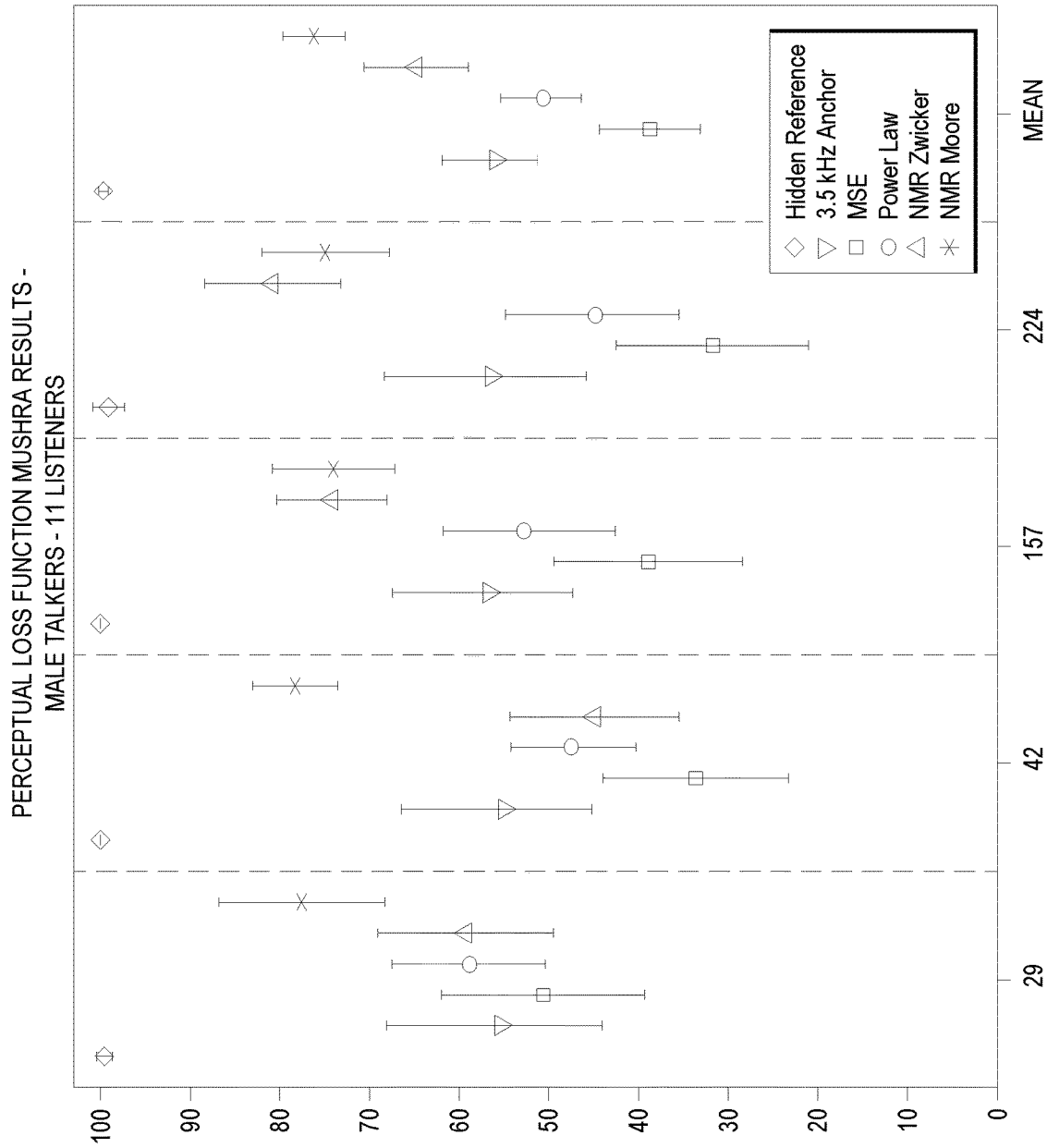
FIG. 12 shows examples of subjective test results for audio data corresponding to male talkers that was produced by a neural network trained using various types of loss functions.

FIG. 12 shows examples of subjective test results for audio data corresponding to male talkers that was produced by a neural network trained using various types of loss functions. In this example, the subjective test results are MUltiple Stimulus test with Hidden Reference and Anchor (MUSHRA) ratings. MUSHRA, which is described in ITU-R BS.1534, is a well-known methodology for conducting a codec listening test to evaluate the perceived quality of the output from lossy audio compression algorithms. The MUSHRA method has the advantage of displaying many stimuli simultaneously so that subjects can carry out any comparison between them directly. The time taken to perform the test using the MUSHRA method can be significantly reduced relative to other methods. This is true in part because the results from all codecs are presented at the same time, on the same samples, so that a paired t-test or a repeated measures analysis of variance can be used for statistical analysis. The numbers along the x axis in FIG. 12 are the identification numbers of different audio files.

More specifically, FIG. 12 shows a comparison between MUSHRA ratings of audio data produced by the same neural network trained using a loss function based on MSE, using a loss function based on power-law, using a loss function based on NMR-Zwicker and using a loss function based on NMR-Moore, audio data produced by applying a 3.5 kHz low-pass filter (one of the standard "anchors" of the MUSHRA methodology), and reference audio data. In this example, the MUSHRA ratings were obtained from 11 different listeners. As shown in FIG. 12, the mean MUSHRA ratings for audio data produced by the neural network trained using a loss function based on NMR-Moore were significantly higher than any of the others. The difference, which was roughly 30 MUSHRA points, is a large effect that is rarely seen. The second-highest mean MUSHRA ratings were for audio data produced by the neural network trained using a loss function based on NMR-Zwicker.

Figure 13:
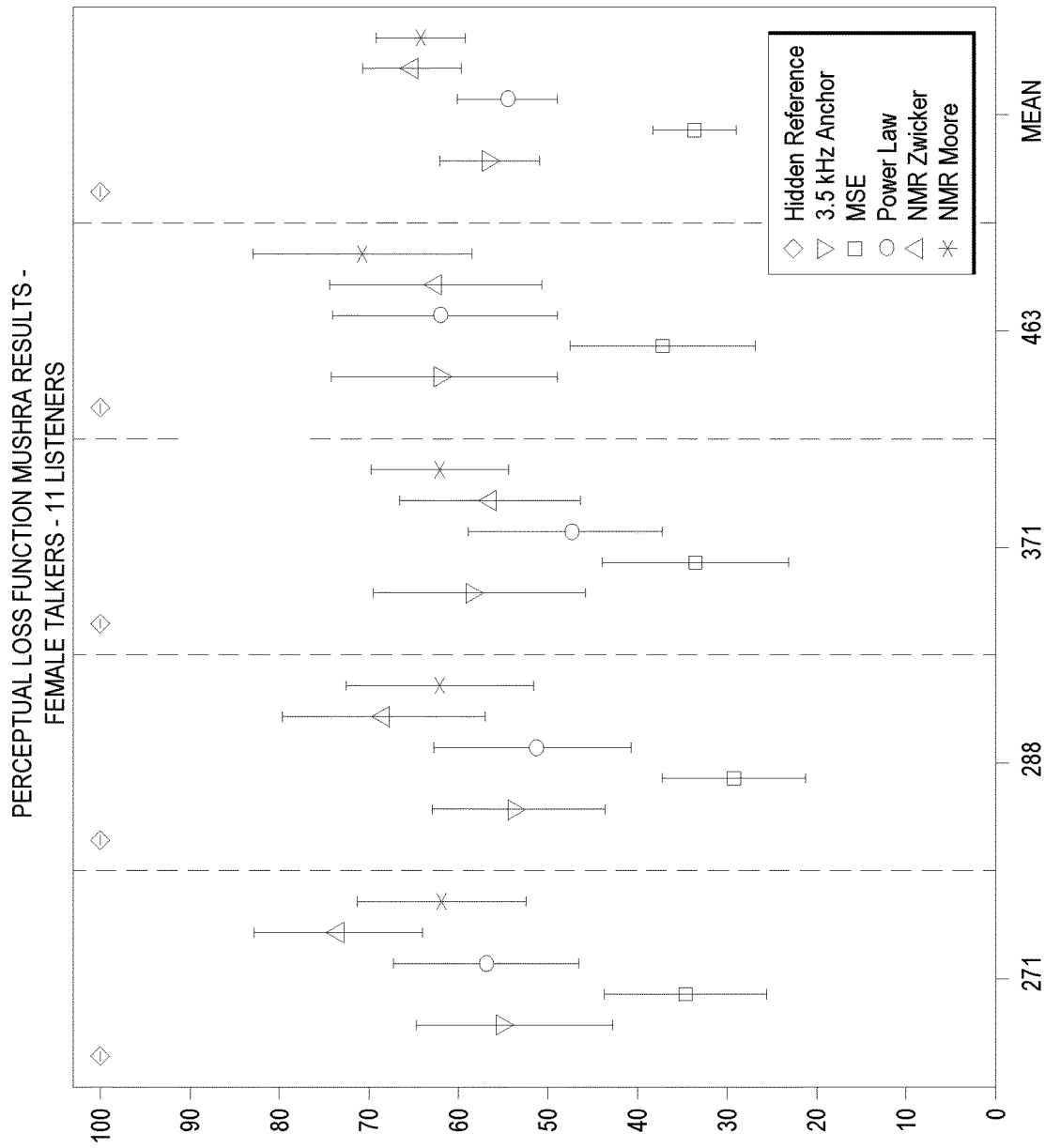
FIG. 13 shows examples of subjective test results for audio data corresponding to female talkers that was produced by a neural network trained using the same types of loss functions that are represented in FIG. 12.

FIG. 13 shows examples of subjective test results for audio data corresponding to female talkers that was produced by a neural network trained using the same types of loss functions that are represented in FIG. 12. As in FIG. 12, the numbers along the x axis in FIG. 13 are the identification numbers of different audio files. In this example, the highest mean MUSHRA ratings were once again assigned to audio data produced by the neural network after being trained using loss functions based on NMR. Although the perceived differences between the NMR-Moore and NMR-Zwicker audio data and the other audio data were not as pronounced in this example as the perceived differences shown in FIG. 12, the results shown in FIG. 13 nonetheless indicate significant improvements.

The general principles defined herein may be applied to other implementations without departing from the scope of this disclosure. Thus, the claims are not intended to be limited to the implementations shown herein, but are to be accorded the widest scope consistent with this disclosure, the principles and the novel features disclosed herein.

Various aspects of the present invention may be appreciated from the following enumerated example embodiments (EEEs):

1. A computer-implemented audio processing method, comprising:

receiving, by a neural network implemented via a control system comprising one or more processors and one or more non-transitory storage media, an input audio signal;

generating, by the neural network and based on the input audio signal, an encoded audio signal;

decoding, via the control system, the encoded audio signal to produce a decoded audio signal;

receiving, by a loss function generating module that is implemented via the control system, the decoded audio signal and a ground truth audio signal;

generating, by the loss function generating module, a loss function value corresponding to the decoded audio signal, wherein generating the loss function value comprises applying a psychoacoustic model; and training the neural network based on the loss function value, wherein the training involves updating at least one weight of the neural network.

2. The method of EEE 1, wherein training the neural network comprises backward propagation based on the loss function value.

3. The method of EEE 1 or EEE 2, wherein the neural network comprises an autoencoder.

4. The method of any one of EEEs 1-3, wherein training the neural network comprises changing a physical state of at least one non-transitory storage medium location corresponding with at least one weight of the neural network.

5. The method of any one of EEEs 1-4, wherein a first portion of the neural network generates the encoded audio signal and a second portion of the neural network decodes the encoded audio signal.

6. The method of EEE 5, wherein the first portion of the neural network comprises an input neuron layer and a plurality of hidden neuron layers, wherein the input neuron layer includes more neurons than a final hidden neuron layer.

7. The method of EEE 5, wherein at least some neurons of the first portion of the neural network are configured with rectified linear unit (ReLU) activation functions.

8. The method of EEE 5, wherein at least some neurons in hidden layers of the second portion of the neural network are configured with rectified linear unit (ReLU) activation functions and wherein at least some neurons in an output layer of the second portion are configured with sigmoidal activation functions.

9. The method of any one of EEEs 1-8, wherein the psychoacoustic model is based, at least in part, on one or more psychoacoustic masking thresholds.

10. The method of any one of EEEs 1-9, wherein the psychoacoustic model involves on one or more of the following: modeling an outer ear transfer function; grouping into critical bands; frequency-domain masking, including but not limited to level-dependent spreading; modeling of a frequency-dependent hearing threshold; or calculation of a noise-to-mask ratio.

11. The method of any one of EEEs 1-10, wherein the loss function involves calculating an average noise-to-masking ratio and wherein the training involves minimizing the average noise-to-masking ratio.

12. An audio encoding method, comprising:
receiving, by a control system comprising one or more processors and one or more non-transitory storage media operatively coupled to the one or more processors, a currently-input audio signal, the control system being configured to implement an audio encoder comprising a neural network that has been trained according to any one of the methods recited in EEEs 1-11;
encoding, via the audio encoder, the currently-input audio signal in a compressed audio format; and
outputting an encoded audio signal in the compressed audio format.

13. An audio decoding method, comprising:
receiving, by a control system comprising one or more processors and one or more non-transitory storage media operatively coupled to the one or more processors, a currently-input compressed audio signal, the control system being configured to implement an audio decoder comprising a neural network that has been trained according to any one of the methods recited in EEEs 1-11;
decoding, via the audio decoder, the currently-input compressed audio signal; and
outputting a decoded audio signal.

14. The method of EEE 13, further comprising reproducing the decoded audio signal via one or more transducers.

15. An apparatus, comprising:
an interface system; and
a control system comprising one or more processors and one or more non-transitory storage media operatively coupled to the one or more processors, the control system configured to implement the method of any one of EEEs 1-14.

16. One or more non-transitory media having software stored thereon, the software including instructions for controlling one or more devices to perform the method of any one of EEEs 1-14.

17. An audio encoding apparatus, comprising:
an interface system; and
a control system comprising one or more processors and one or more non-transitory storage media operatively coupled to the one or more processors, the control system configured to implement an audio encoder, the audio encoder comprising a neural network that has been trained according to any one of the methods recited in EEEs 1-11, wherein the control system is configured for:
receiving a currently-input audio signal;
encoding the currently-input audio signal in a compressed audio format; and
outputting an encoded audio signal in the compressed audio format.

18. An audio encoding apparatus, comprising:
an interface system; and
a control system comprising one or more processors and one or more non-transitory storage media operatively coupled to the one or more processors, the control system configured to implement an audio encoder, the audio encoder comprising a neural network that has been trained according to a process comprising:
receiving, by the neural network and via the interface system, an input training audio signal;
generating, by the neural network and based on the input training audio signal, an encoded training audio signal;
decoding, via the control system, the encoded training audio signal to produce a decoded training audio signal;
receiving, by a loss function generating module that is implemented via the control system, the decoded training audio signal and a ground truth audio signal;
generating, by the loss function generating module, a loss function value corresponding to the decoded training audio signal, wherein generating the loss function value comprises applying a psychoacoustic model; and
training the neural network based on the loss function value;
wherein the audio encoder is further configured for:
receiving a currently-input audio signal;
encoding the currently-input audio signal in a compressed audio format; and
outputting an encoded audio signal in the compressed audio format.

19. A system that includes an audio decoding apparatus, comprising:
an interface system;
a control system comprising one or more processors and one or more non-transitory storage media operatively coupled to the one or more processors, the control system configured to implement an audio decoder, the audio decoder comprising a neural network that has been trained according to a process comprising:
receiving, by the neural network and via the interface system, an input training audio signal;
generating, by the neural network and based on the input training audio signal, an encoded training audio signal;
decoding, via the control system, the encoded training audio signal to produce a decoded training audio signal;

receiving, by a loss function generating module that is implemented via the control system, the decoded training audio signal and a ground truth audio signal;

generating, by the loss function generating module, a loss function value corresponding to the decoded training audio signal, wherein generating the loss function value comprises applying a psychoacoustic model; and training the neural network based on the loss function value;

wherein the audio decoder is further configured for:

receiving a currently-input encoded audio signal in a compressed audio format;

decoding the currently-input encoded audio signal in a decompressed audio format; and outputting a decoded audio signal in the decompressed audio format.

20. The system of EEE 19, wherein the system further comprises one or more transducers configured for reproducing the decoded audio signal.

The invention claimed is:

1. A computer-implemented method for training an autoencoder neural network implemented via a control system comprising one or more processors and one or more non-transitory storage media, comprising:

receiving, by the autoencoder neural network, an input audio signal comprising audio data;

generating, by an encoder portion of the autoencoder neural network and based on the input audio signal, an encoded audio signal;

decoding, by a decoder portion of the autoencoder neural network, the encoded audio signal to produce at least one of a decoded audio signal and decoded transform coefficients;

receiving, by a loss function generating module that is implemented via the control system, said at least one of the decoded audio signal and the decoded transform coefficients and a ground truth audio signal;

generating, by the loss function generating module, a loss function value corresponding to said at least one of the decoded audio signal and the decoded transform coefficients; and training the autoencoder neural network based on the loss function value, wherein the training involves updating at least one weight of the autoencoder neural network, wherein generating the loss function value comprises applying a psychoacoustic model, which includes calculation of a noise-to-mask ratio.

2. The method of claim 1, wherein training the autoencoder neural network comprises backward propagation based on the loss function value.

3. The method of claim 1, wherein training the autoencoder neural network comprises changing a physical state of at least one non-transitory storage medium location corresponding with at least one weight of the autoencoder neural network.

4. The method of claim 1, wherein the encoder portion of the autoencoder neural network comprises an input neuron layer and a plurality of hidden neuron layers, wherein the input neuron layer includes more neurons than a final hidden neuron layer.

5. The method of claim 1, wherein at least some neurons of the encoder portion of the autoencoder neural network are configured with rectified linear unit (ReLU) activation functions.

6. The method of claim 1, wherein at least some neurons in hidden layers of the decoder portion of the autoencoder neural network are configured with rectified linear unit (ReLU) activation functions and wherein at least some neurons in an output layer of the decoder portion are configured with sigmoidal activation functions.

7. The method of claim 1, wherein the psychoacoustic model is based, at least in part, on one or more psychoacoustic masking thresholds.

8. The method of claim 1, wherein the psychoacoustic model involves on one or more of the following:

modeling an outer ear transfer function;

grouping into critical bands;

frequency-domain masking, including but not limited to level-dependent spreading; and modeling of a frequency-dependent hearing threshold.

9. The method of claim 8, wherein generating the loss function value comprises:

transforming the decoded audio signal to a frequency domain to generate a frequency transformed decoded audio signal;

transforming the ground truth audio signal to the frequency domain to generate a frequency transformed ground truth audio signal;

applying an outer ear transfer function to the frequency transformed decoded audio signal to generate a first intermediate signal;

applying the outer ear transfer function to the frequency transformed ground truth audio signal to generate a second intermediate signal;

determining a difference between the first intermediate signal and the second intermediate signal to generate a difference signal;

applying a banding operation to the first intermediate signal to generate a plurality of frequency bands of the first intermediate signal;

applying the banding operation to the second intermediate signal to generate a plurality of frequency bands of the second intermediate signal;

applying a frequency masking operation to the plurality of frequency bands of the second intermediate signal to generate a plurality of masked bands;

determining a noise-to-mask ratio using the plurality of frequency bands of the first intermediate signal and a masked band; and using the noise-to-mask ratio as the loss function value.

10. The method of claim 1, wherein the loss function value involves calculating an average noise-to-masking ratio and wherein the training involves minimizing the average noise-to-masking ratio.

11. The method of claim 1, wherein the calculation of the noise-to-mask ratio involves a banding process.

12. The method of claim 11, wherein the banding process is a Zwicker banding process or a Moore banding process.

13. Audio encoder, comprising the encoder portion of a neural network that has been trained according to the method of claim 1, wherein the audio encoder is further configured to:

receive a currently-input audio signal;

encode the currently-input audio signal in a compressed audio format; and output an encoded signal in the compressed audio format.

14. An audio encoding apparatus, comprising:

an interface system; and a control system comprising one or more processors and one or more non-transitory storage media operatively coupled to the one or more processors, the control system configured to implement an audio encoder according to claim 13.

15. An audio decoder, comprising the decoder portion of a neural network that has been trained according to the method of claim 1, wherein the audio decoder is further configured to:
receive a currently-input encoded audio signal in a compressed audio format;
decode the currently-input encoded audio signal in a decompressed audio format; and
output a decoded audio signal in the decompressed audio format.

16. An audio decoding apparatus, comprising:
an interface system;
a control system comprising one or more processors and one or more non-transitory storage media operatively coupled to the one or more processors, the control system configured to implement an audio decoder, the audio decoder comprising the decoder portion of a neural network that has been trained according to the method of
wherein the audio decoder is further configured for:
receiving a currently-input encoded audio signal in a compressed audio format;
decoding the currently-input encoded audio signal in a decompressed audio format; and
outputting a decoded audio signal in the decompressed audio format.

17. A system including the audio decoding apparatus of claim 16, wherein the system further comprises one or more transducers configured for reproducing the decoded audio signal.

18. One or more non-transitory media having software stored thereon, the software including instructions for controlling one or more devices to perform the method of claim 1.

19. A non-transitory computer program product having instructions which, when executed by a computing device or system, cause said computing device or system to perform the method according to claim 1.

* * * * *